US012615075B2

(12) United States Patent
Zaev et al.

(10) Patent No.: US 12,615,075 B2
(45) Date of Patent: Apr. 28, 2026

(54) NETWORK-INDEPENDENT INTELLIGENT REFLECTING SURFACE

(71) Applicant: Apple Inc., Cupertino, CA (US)

(72) Inventors: Danila Zaev, Munich (DE); Ayman F Naguib, Cupertino, CA (US); Yu-Ting Yu, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 324 days.

(21) Appl. No.: 18/181,130

(22) Filed: Mar. 9, 2023

(65) Prior Publication Data

US 2023/0370134 A1      Nov. 16, 2023

Related U.S. Application Data

(60) Provisional application No. 63/342,489, filed on May 16, 2022.

(51) Int. Cl.
H04B 7/06          (2006.01)

(52) U.S. Cl.
CPC ......... H04B 7/0617 (2013.01); H04B 7/0632 (2013.01)

(58) Field of Classification Search
CPC .... H04B 7/04013; H04B 7/06; H04B 7/0617; H04B 7/0632; H04B 7/08; H04B 7/086; H04B 7/145; H04L 25/02; H04L 25/0202
See application file for complete search history.

(56) References Cited

U.S. PATENT DOCUMENTS

| | | | |
|---|---|---|---|
| 11,522,648 B2 | 12/2022 | Kim et al. | |
| 2021/0337617 A1* | 10/2021 | Bao ........................ | H04W 72/21 |
| 2022/0014935 A1* | 1/2022 | Haija .................... | H04L 5/0048 |

(Continued)

FOREIGN PATENT DOCUMENTS

| | | |
|---|---|---|
| WO | 2021221603 A1 | 11/2021 |
| WO | 2022233250 A1 | 11/2022 |
| WO | 2023017119 A1 | 2/2023 |

OTHER PUBLICATIONS

Wu et al., Intelligent Reflecting Surface Enhanced Wireless Network via Joint Active and Passive Beamforming, IEEE, 16 pages, Nov. 2019.*

(Continued)

*Primary Examiner* — Frank Duong
(74) *Attorney, Agent, or Firm* — Treyz Law Group, P.C.; Michael H. Lyons

(57)          ABSTRACT

A user equipment (UE) device may communicate with a base station using signals reflected off a network-independent intelligent reflecting surface (IRS). The UE device and the IRS may form part of a virtual UE device, the components of which communicate with each other and with other virtual UE devices over a channel control plane (CCP) separate from the control and data plane of the base station. The CCP may be used to perform control functions for the virtual UE device such as channel estimation, synchronization, scheduling, sensing, and beamforming. The IRS may be controlled by the UE device, a service controller, or itself. Grouping the UE device and IRS into a virtual UE device may keep the structure the presence of the IRS transparent to the network while allowing the UE device to have more beneficial channel propagation properties relative to when the IRS is registered to the network.

18 Claims, 11 Drawing Sheets

(56) References Cited

U.S. PATENT DOCUMENTS

| | | | |
|---|---|---|---|
| 2022/0123803 A1* | 4/2022 | Rimalapudi | H04B 7/0626 |
| 2022/0247455 A1 | 8/2022 | Raghavan et al. | |
| 2022/0377730 A1* | 11/2022 | Yang | H04W 52/36 |
| 2022/0393363 A1 | 12/2022 | Jornet et al. | |
| 2023/0176174 A1* | 6/2023 | Penna | H01Q 3/46 |
| | | | 342/451 |
| 2023/0254031 A1* | 8/2023 | Gurelli | H04B 7/0617 |
| | | | 455/15 |
| 2023/0291460 A1* | 9/2023 | Gurelli | H04B 7/145 |
| 2024/0097742 A1* | 3/2024 | Ly | H04B 7/04013 |
| 2024/0235622 A1* | 7/2024 | Sahraei | H04B 7/1555 |
| 2024/0388326 A1* | 11/2024 | Haghighat | H04B 7/04013 |
| 2024/0413868 A1* | 12/2024 | Haghighat | H04L 25/0204 |

OTHER PUBLICATIONS

He et al., Reconfigurable Intelligent Surface Assisted Massive MIMO with Antenna Selection, arXiv, 13 pages, Sep. 16, 2020.*

Qingqing Wu et al., Intelligent Reflecting Surface Aided Wireless Communications: A Tutorial, IEEE Transactions on Communications, Jan. 2021, pp. 1-39, vol. 69, IEEE, New York, NY, United States.

Kilong Pei et al., RIS-Aided Wireless Communications:Prototyping, Adaptive Beamforming, and Indoor/Outdoor Field Trials, IEEE Transactions on Communications, Sep. 2021, pp. 1-13, vol. 69, IEEE, New York, NY, United States.

* cited by examiner $$H^{EFF} = H^{BU} + \sum_i H_i^{BI} \Lambda_i H_i^{IU}$$

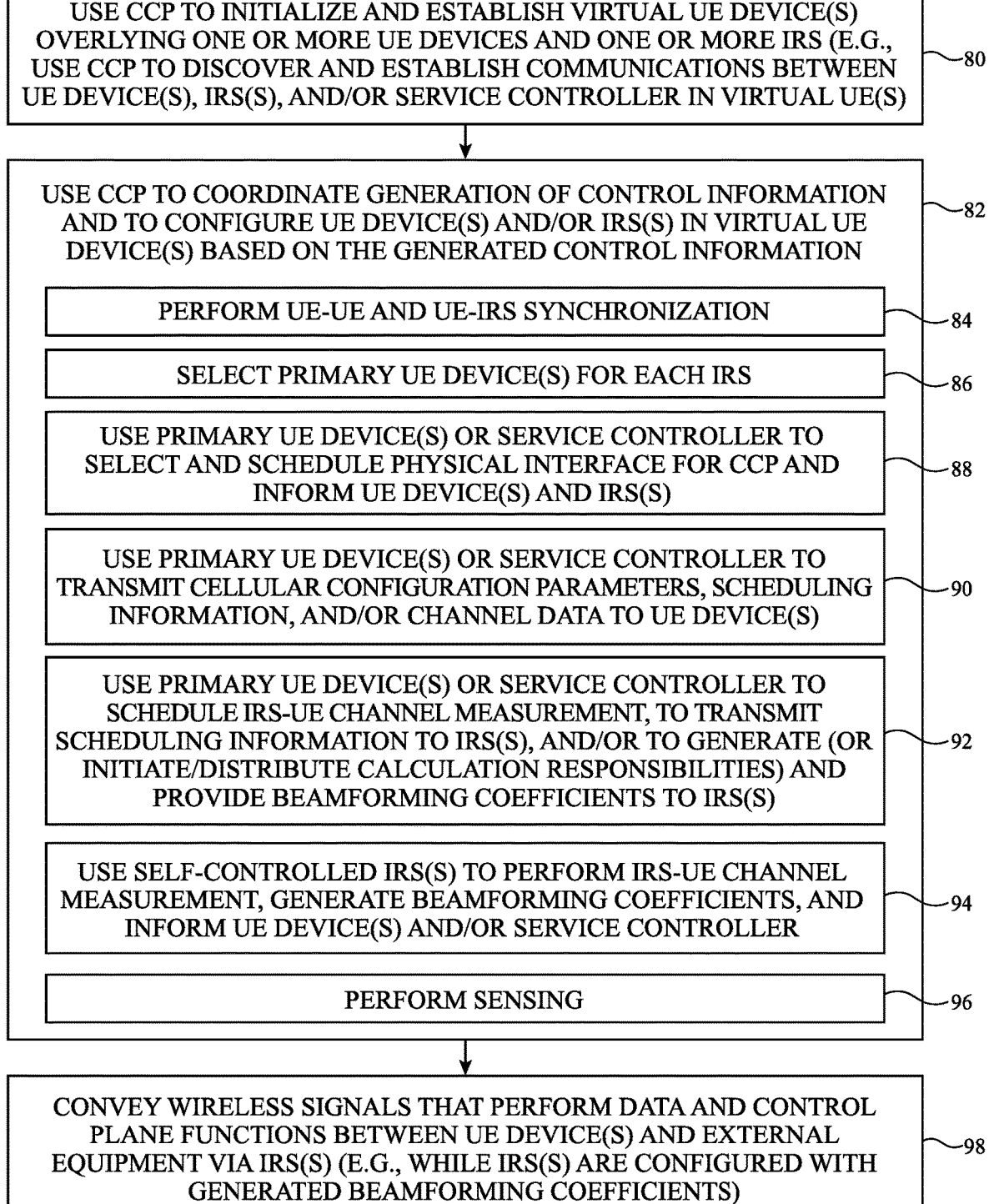

USE CCP TO INITIALIZE AND ESTABLISH VIRTUAL UE DEVICE(S) OVERLYING ONE OR MORE UE DEVICES AND ONE OR MORE IRS (E.G., USE CCP TO DISCOVER AND ESTABLISH COMMUNICATIONS BETWEEN UE DEVICE(S), IRS(S), AND/OR SERVICE CONTROLLER IN VIRTUAL UE(S) — 80

USE CCP TO COORDINATE GENERATION OF CONTROL INFORMATION AND TO CONFIGURE UE DEVICE(S) AND/OR IRS(S) IN VIRTUAL UE DEVICE(S) BASED ON THE GENERATED CONTROL INFORMATION — 82

PERFORM UE-UE AND UE-IRS SYNCHRONIZATION — 84

SELECT PRIMARY UE DEVICE(S) FOR EACH IRS — 86

USE PRIMARY UE DEVICE(S) OR SERVICE CONTROLLER TO SELECT AND SCHEDULE PHYSICAL INTERFACE FOR CCP AND INFORM UE DEVICE(S) AND IRS(S) — 88

USE PRIMARY UE DEVICE(S) OR SERVICE CONTROLLER TO TRANSMIT CELLULAR CONFIGURATION PARAMETERS, SCHEDULING INFORMATION, AND/OR CHANNEL DATA TO UE DEVICE(S) — 90

USE PRIMARY UE DEVICE(S) OR SERVICE CONTROLLER TO SCHEDULE IRS-UE CHANNEL MEASUREMENT, TO TRANSMIT SCHEDULING INFORMATION TO IRS(S), AND/OR TO GENERATE (OR INITIATE/DISTRIBUTE CALCULATION RESPONSIBILITIES) AND PROVIDE BEAMFORMING COEFFICIENTS TO IRS(S) — 92

USE SELF-CONTROLLED IRS(S) TO PERFORM IRS-UE CHANNEL MEASUREMENT, GENERATE BEAMFORMING COEFFICIENTS, AND INFORM UE DEVICE(S) AND/OR SERVICE CONTROLLER — 94

PERFORM SENSING — 96

CONVEY WIRELESS SIGNALS THAT PERFORM DATA AND CONTROL PLANE FUNCTIONS BETWEEN UE DEVICE(S) AND EXTERNAL EQUIPMENT VIA IRS(S) (E.G., WHILE IRS(S) ARE CONFIGURED WITH GENERATED BEAMFORMING COEFFICIENTS) — 98

*FIG. 5*

Figure 6:
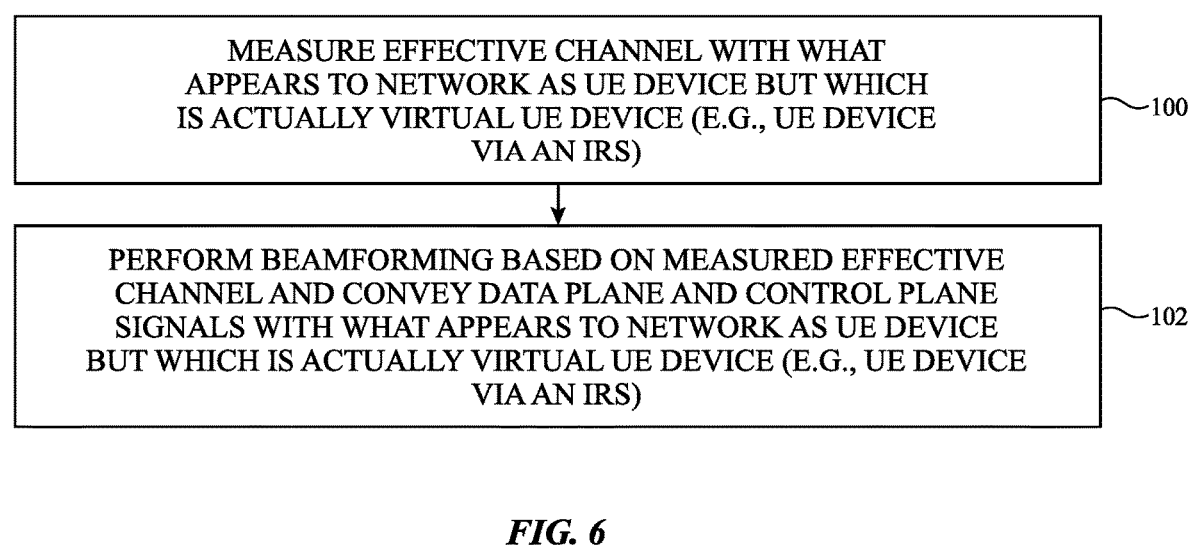

MEASURE EFFECTIVE CHANNEL WITH WHAT
APPEARS TO NETWORK AS UE DEVICE BUT WHICH
IS ACTUALLY VIRTUAL UE DEVICE (E.G., UE DEVICE
VIA AN IRS)

~100

PERFORM BEAMFORMING BASED ON MEASURED EFFECTIVE
CHANNEL AND CONVEY DATA PLANE AND CONTROL PLANE
SIGNALS WITH WHAT APPEARS TO NETWORK AS UE DEVICE
BUT WHICH IS ACTUALLY VIRTUAL UE DEVICE (E.G., UE DEVICE
VIA AN IRS)

NETWORK-INDEPENDENT INTELLIGENT REFLECTING SURFACE

This application claims the benefit of U.S. Provisional Patent Application No. 63/342,489, filed May 16, 2022, which is hereby incorporated by reference herein in its entirety.

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The wireless circuitry is used to perform communications using radio-frequency signals conveyed by the antennas.

As software applications on electronic devices become more data-intensive over time, demand has grown for electronic devices that support wireless communications at higher data rates. However, the maximum data rate supported by electronic devices is limited by the frequency of the radio-frequency signals. As the frequency of the radio-frequency signals increases, it can become increasingly difficult to perform satisfactory wireless communications because the signals become subject to significant over-the-air attenuation and typically require line-of-sight.

SUMMARY

A user equipment (UE) device may communicate with external equipment using wireless signals that are reflected off an intelligent reflecting surface (IRS). The IRS may be a network-independent IRS that is transparent to the external equipment. The external equipment may therefore communicate with the UE device via the IRS as if it were communicating directly with the UE device (e.g., for the purposes of channel estimation and beamforming). At the same time, the UE device and the IRS may form part of a virtual UE device. The virtual UE device may include the IRS and optionally a service controller. The components of the virtual UE device may communicate with each other and/or with other virtual UE devices over a dedicated channel control plane (CCP). The CCP may be different from the control plane and the data plane of the external equipment, which is used to convey the wireless signals between the UE device and the external equipment.

The CCP may be used to perform control functions of the virtual UE device. Since the IRS is network-independent, the IRS may be controlled by the UE device, by the service controller, or by itself (e.g., as a self-controlled IRS). The CCP may be used to synchronize UE devices with each other, to synchronize UE devices with the IRS(s), and/or to select primary UE devices to control each of the IRS's. The primary UE device or the service controller may use the CCP to transmit cellular configuration parameters, scheduling information, and/or channel data to the UE devices. The primary UE device or the service controller may use the CCP to schedule IRS-UE channel measurements, to transmit scheduling information to the IRS(s), and/or to generate (or initiate/distribute calculation responsibilities) beamforming coefficients for the IRS(s) based on the channel measurements. The UE device(s) may generate channel measurements used in generating beamforming coefficients and/or may generate beamforming coefficients based on the channel measurements and may inform other UE device(s), the IRS(s), and/or the service controller over the CCP. The CCP may be used to transmit the beamforming coefficients to the IRS(s). When self-controlled, the IRS may generate channel measurements and/or beamforming coefficients for itself and may use the CCP to inform the UE devices and the service controller. The IRS may use the beamforming coefficients to reflect signals between the UE devices and the external equipment.

The CCP may utilize different physical interfaces or radio access technologies based on the type of data to be transmitted over the CCP. The primary UE device or the service controller may select and schedule the physical interfaces for the CCP. The UE device and the IRS(s) may use the CCP to perform radio-frequency sensing of an external object (e.g., using a simultaneous localization and mapping (SLAM) procedure). The IRS(s) may use the CCP to transmit identifiers or other information to UE devices in close proximity to help synchronize UE devices from different virtual UE devices together. Logically grouping the UE devices and IRS(s) into virtual UE device(s) for generating channel measurements and controlling the IRS(s) over the CCP while the structure of the virtual UE device(s) and the presence of the IRS(s) remain transparent to the network may allow the UE device(s) to have more beneficial channel propagation properties in communicating with the external equipment relative to examples where the IRS(s) are known and registered to the network.

An aspect of the disclosure provides a method of operating a system having a user equipment (UE) device, a wireless base station, and an intelligent reflecting surface (IRS). The method can include wirelessly conveying control signals within a virtual UE device via a channel control plane (CCP), the virtual UE device including the UE device and the IRS. The method can include configuring, using the CCP, antenna elements on the IRS with a set of beamforming coefficients. The method can include reflecting, at the IRS, wireless signals between the wireless base station and the UE device while the antenna elements are configured with the set of beamforming coefficients, the wireless signals performing functions of a control plane and a data plane of the wireless base station that are different from the CCP.

An aspect of the disclosure provides an electronic device. The electronic device can include one or more antennas configured to transmit wireless signals to external equipment via reflection off an intelligent reflecting surface (IRS), the wireless signals operating over a control plane and a data plane of the external equipment. The electronic device can include a transmitter configured to use the one or more antennas to transmit control signals that control operation of the IRS to the IRS over a channel control plane (CCP) that is different from the control plane and the data plane of the external equipment.

An aspect of the disclosure provides a method of operating an intelligent reflecting surface (IRS). The method can include generating, at one or more processors, channel measurements characterizing radio-frequency propagation between the IRS and one or more user equipment (UE) devices. The method can include generating, at the one or more processors, beamforming coefficients based on the channel measurements. The method can include reflecting, using a set of antenna elements configured with beamforming coefficients, wireless signals between the one or more UE devices and a wireless base station.

BRIEF DESCRIPTION OF THE DRAWINGS

FIG. 5 is a flow chart of illustrative operations involved in using a dedicated channel control plane (CCP) to establish and operate one or more virtual UE devices using one or more UE devices, one or more network-independent IRS's, and optionally a service controller in accordance with some embodiments.

FIG. 6 is a flow chart of illustrative operations involved in using external communications equipment to communicate with a UE device within a virtual UE device in accordance with some embodiments.

DETAILED DESCRIPTION

Figure 1:
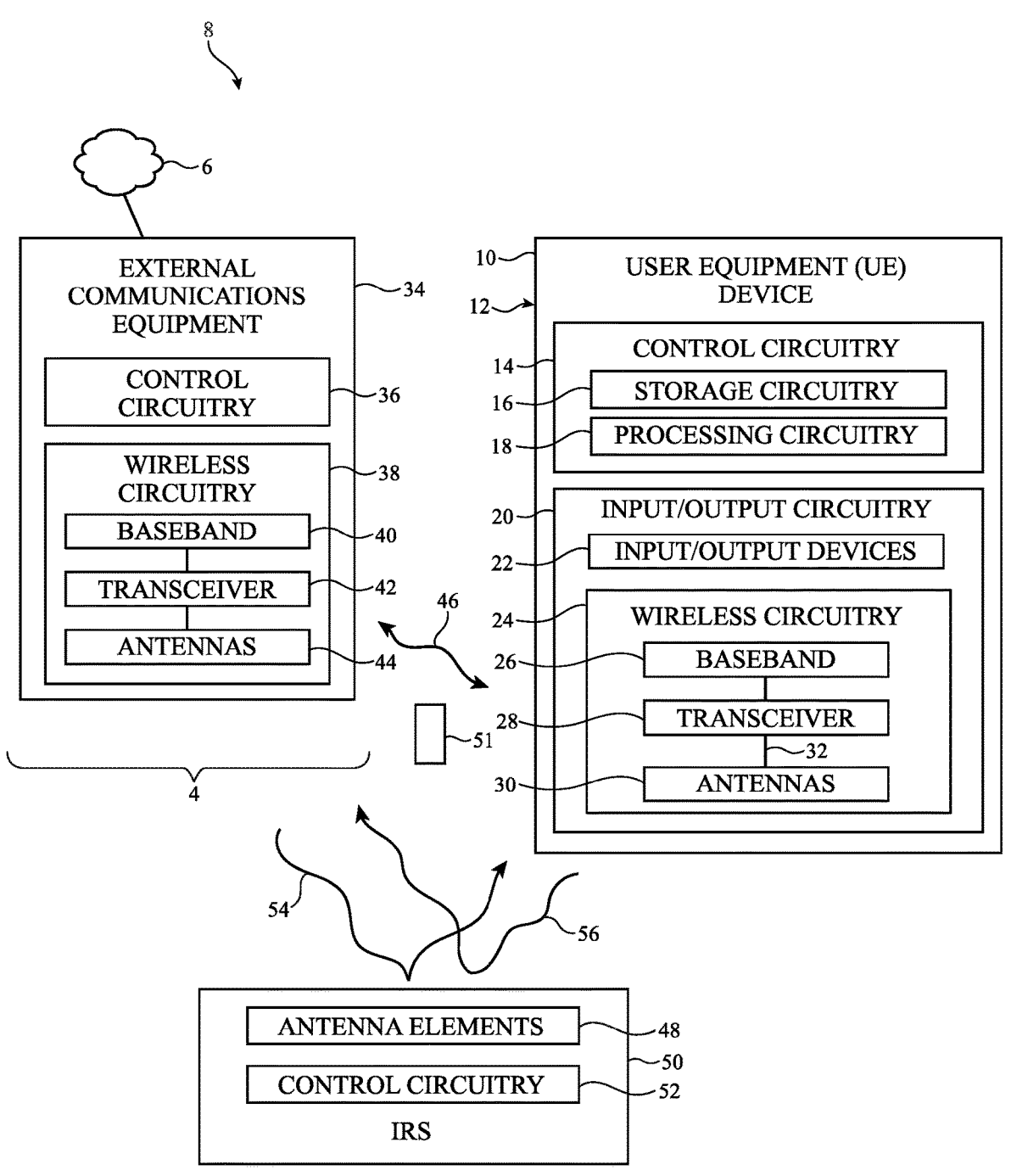
FIG. 1 is a schematic block diagram of an illustrative communications system having a user equipment (UE) device, external communications equipment, and an intelligent reflecting surface (IRS) in accordance with some embodiments.

FIG. 1 is a schematic diagram of an illustrative communications system 8 (sometimes referred to herein as communications network 8) for conveying wireless data between communications terminals. Communications system 8 may include network nodes (e.g., communications terminals). The network nodes may include user equipment (UE) such as one or more UE devices 10. The network nodes may also include external communications equipment (e.g., communications equipment other than UE devices 10) such as external communications equipment 34. External communications equipment 34 (sometimes referred to herein simply as external equipment 34) may include one or more electronic devices and may be a wireless base station, wireless access point, or other wireless equipment for example. UE device 10 and external equipment 34 may communicate with each other using one or more wireless communications links. If desired, UE devices 10 may wirelessly communicate with external equipment 34 without passing communications through any other intervening network nodes in communications system 8 (e.g., UE devices 10 may communicate directly with external equipment 34 over-the-air).

External equipment 34 may be communicably coupled to one or more other network nodes 6 in a larger communications network 4 via wired and/or wireless links Network 4 may include one or more wired communications links (e.g., communications links formed using cabling such as ethernet cables, radio-frequency cables such as coaxial cables or other transmission lines, optical fibers or other optical cables, etc.), one or more wireless communications links (e.g., short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles, etc.), communications gateways, wireless access points, base stations, switches, routers, servers, modems, repeaters, telephone lines, network cards, line cards, portals, user equipment (e.g., computing devices, mobile devices, etc.), etc. Network 4 may include communications (network) nodes or terminals coupled together using these components or other components (e.g., some or all of a mesh network, relay network, ring network, local area network, wireless local area network, personal area network, cloud network, star network, tree network, or networks of communications nodes having other network topologies), the Internet, combinations of these, etc. UE devices 10 may send data to and/or may receive data from other nodes or terminals in network 4 via external equipment 34 (e.g., external equipment 34 may serve as an interface between user equipment devices 10 and the rest of the larger communications network). Network 4 may be managed, operated, controlled, or run by a corresponding network service provider (e.g., a cellular network carrier).

User equipment (UE) device 10 of FIG. 1 is an electronic device (sometimes referred to herein as electronic device 10 or device 10) and may be a computing device such as a laptop computer, a desktop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses, goggles, or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, equipment that implements the functionality of two or more of these devices, or other electronic equipment.

As shown in the functional block diagram of FIG. 1, UE device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, part or all of housing 12 may be formed from dielectric or other low-conductivity material (e.g., glass, ceramic, plastic, sapphire, etc.). In other situations, housing 12 or at least some of the structures that make up housing 12 may be formed from metal elements.

UE device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors, microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, Sixth Generation (6G) protocols, sub-THz protocols, THz protocols, etc.), antenna diversity protocols, satellite navigation system protocols (e.g., global positioning system (GPS) protocols, global navigation satellite system (GLONASS) protocols, etc.), antenna-based spatial ranging protocols, optical communications protocols, or any other desired communications protocols. Each communications protocol may be associated with a corresponding radio access technology (RAT) that specifies the physical connection methodology used in implementing the protocol.

UE device 10 may include input-output circuitry 20. Input-output circuitry 20 may include input-output devices 22. Input-output devices 22 may be used to allow data to be supplied to UE device 10 and to allow data to be provided from UE device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to UE device 10 using wired or wireless connections (e.g., some of input-output devices 22 may be peripherals that are coupled to a main processing unit or other portion of UE device 10 via a wired or wireless link).

Input-output circuitry 20 may include wireless circuitry 24 to support wireless communications. Wireless circuitry 24 (sometimes referred to herein as wireless communications circuitry 24) may include baseband circuitry such as baseband circuitry 26 (e.g., one or more baseband processors and/or other circuitry that operates at baseband), radio-frequency (RF) transceiver circuitry such as transceiver 28, and one or more antennas 30. If desired, wireless circuitry 24 may include multiple antennas 30 that are arranged into a phased antenna array (sometimes referred to as a phased array antenna) that conveys radio-frequency signals within a corresponding signal beam that can be steered in different directions. Baseband circuitry 26 may be coupled to transceiver 28 over one or more baseband data paths. Transceiver 28 may be coupled to antennas 30 over one or more radio-frequency transmission line paths 32. If desired, radio-frequency front end circuitry may be disposed on radio-frequency transmission line path(s) 32 between transceiver 28 and antennas 30.

In the example of FIG. 1, wireless circuitry 24 is illustrated as including only a single transceiver 28 and a single radio-frequency transmission line path 32 for the sake of clarity. In general, wireless circuitry 24 may include any desired number of transceivers 28, any desired number of radio-frequency transmission line paths 32, and any desired number of antennas 30. Each transceiver 28 may be coupled to one or more antennas 30 over respective radio-frequency transmission line paths 32. Radio-frequency transmission line path 32 may be coupled to antenna feeds on one or more antenna 30. Each antenna feed may, for example, include a positive antenna feed terminal and a ground antenna feed terminal. Radio-frequency transmission line path 32 may have a positive transmission line signal path that is coupled to the positive antenna feed terminal and may have a ground transmission line signal path that is coupled to the ground antenna feed terminal. This example is merely illustrative and, in general, antennas 34 may be fed using any desired antenna feeding scheme.

Radio-frequency transmission line path 32 may include transmission lines that are used to route radio-frequency antenna signals within device 10. Transmission lines in device 10 may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in device 10 such as transmission lines in radio-frequency transmission line path 32 may be integrated into rigid and/or flexible printed circuit boards. In one embodiment, radio-frequency transmission line paths such as radio-frequency transmission line path 32 may also include transmission line conductors integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

In performing wireless transmission, baseband circuitry 26 may provide baseband signals to transceiver 28 (e.g., baseband signals that include wireless data for transmission). Transceiver 28 may include circuitry for converting the baseband signals received from baseband circuitry 26 into corresponding radio-frequency signals (e.g., for modulating the wireless data onto one or more carriers for transmission, synthesizing a transmit signal, etc.). For example, transceiver 28 may include mixer circuitry for up-converting the baseband signals to radio frequencies prior to transmission over antennas 30. Transceiver 28 may also include digital to analog converter (DAC) and/or analog to digital converter (ADC) circuitry for converting signals between digital and analog domains. Transceiver 28 may transmit the radio-frequency signals over antennas 30 via radio-frequency transmission line path 32. Antennas 30 may transmit the radio-frequency signals to external wireless equipment by radiating the radio-frequency signals into free space.

In performing wireless reception, antennas 30 may receive radio-frequency signals from external equipment 34. The received radio-frequency signals may be conveyed to transceiver 28 via radio-frequency transmission line path 32. Transceiver 28 may include circuitry for converting the received radio-frequency signals into corresponding baseband signals. For example, transceiver 28 may include mixer circuitry for down-converting the received radio-frequency signals to baseband frequencies prior to conveying the baseband signals to baseband circuitry 26 and may include demodulation circuitry for demodulating wireless data from the received signals.

Front end circuitry disposed on radio-frequency transmission line path 32 may include radio-frequency front end components that operate on radio-frequency signals conveyed over radio-frequency transmission line path 32. If desired, the radio-frequency front end components may be formed within one or more radio-frequency front end modules (FEMs). Each FEM may include a common substrate such as a printed circuit board substrate for each of the radio-frequency front end components in the FEM. The radio-frequency front end components in the front end circuitry may include switching circuitry (e.g., one or more radio-frequency switches), radio-frequency filter circuitry (e.g., low pass filters, high pass filters, notch filters, band pass filters, multiplexing circuitry, duplexer circuitry, diplexer circuitry, triplexer circuitry, etc.), impedance matching circuitry (e.g., circuitry that helps to match the impedance of antennas 30 to the impedance of radio-frequency transmission line path 32), antenna tuning circuitry (e.g., networks of capacitors, resistors, inductors, and/or switches that adjust the frequency response of antennas 30), radio-frequency amplifier circuitry (e.g., power amplifier circuitry and/or low-noise amplifier circuitry), radio-frequency coupler circuitry, charge pump circuitry, power management circuitry, digital control and interface circuitry, and/or any other desired circuitry that operates on the radio-frequency signals transmitted and/or received by antennas 30.

While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, baseband circuitry 26 and/or portions of transceiver 28 (e.g., a host processor on transceiver 28) may form a part of control circuitry 14. Baseband circuitry 26 may, for example, access a communication protocol stack on control circuitry 14 (e.g., storage circuitry 16) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

The term "convey wireless signals" as used herein means the transmission and/or reception of the wireless signals (e.g., for performing unidirectional and/or bidirectional wireless communications with external wireless communications equipment). Antennas 30 may transmit the wireless signals by radiating the signals into free space (or to free space through intervening device structures such as a dielectric cover layer). Antennas 30 may additionally or alternatively receive the wireless signals from free space (e.g., through intervening devices structures such as a dielectric cover layer). The transmission and reception of wireless signals by antennas 30 each involve the excitation or resonance of antenna currents on an antenna resonating (radiating) element in the antenna by the wireless signals within the frequency band(s) of operation of the antenna.

Transceiver circuitry 26 may use antenna(s) 30 to transmit and/or receive wireless signals that convey wireless communications data between device 10 and external communications equipment 34 (e.g., one or more other devices such as device 10, a wireless access point or base station, etc.). The wireless communications data may be conveyed bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc.

Additionally or alternatively, wireless circuitry 24 may use antenna(s) 30 to perform wireless (radio-frequency) sensing operations. The sensing operations may allow device 10 to detect (e.g., sense or identify) the presence, location, orientation, and/or velocity (motion) of objects external to device 10. Control circuitry 14 may use the detected presence, location, orientation, and/or velocity of the external objects to perform any desired device operations. As examples, control circuitry 14 may use the detected presence, location, orientation, and/or velocity of the external objects to identify a corresponding user input for one or more software applications running on device 10 such as a gesture input performed by the user's hand(s) or other body parts or performed by an external stylus, gaming controller, head-mounted device, or other peripheral devices or accessories, to determine when one or more antennas 30 needs to be disabled or provided with a reduced maximum transmit power level (e.g., for satisfying regulatory limits on radio-frequency exposure), to determine how to steer (form) a radio-frequency signal beam produced by antennas 30 for wireless circuitry 24 (e.g., in scenarios where antennas 30 include a phased array of antennas 30), to map or model the environment around device 10 (e.g., to produce a software model of the room where device 10 is located for use by an augmented reality application, gaming application, map application, home design application, engineering application, etc.), to detect the presence of obstacles in the vicinity of (e.g., around) device 10 or in the direction of motion of the user of device 10, etc. The sensing operations may, for example, involve the transmission of sensing signals (e.g., radar waveforms), the receipt of corresponding reflected signals (e.g., the transmitted waveforms that have reflected off of external objects), and the processing of the transmitted signals and the received reflected signals (e.g., using a radar scheme).

Wireless circuitry 24 may transmit and/or receive wireless signals within corresponding frequency bands of the electromagnetic spectrum (sometimes referred to herein as communications bands or simply as "bands"). The frequency bands handled by wireless circuitry 24 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (1-1(1) bands below 10 GHz, 5G New Radio Frequency Range 2 (ER2) bands between 20 and 60 GHz, 6G bands at sub-THz or THz frequencies greater than about 100 GHz, etc.), other centimeter or millimeter wave frequency bands between 10-100 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Over time, software applications on electronic devices such as device 10 have become more and more data intensive. Wireless circuitry on the electronic devices therefore needs to support data transfer at higher and higher data rates. In general, the data rates supported by the wireless circuitry are proportional to the frequency of the wireless signals conveyed by the wireless circuitry (e.g., higher frequencies can support higher data rates than lower frequencies). Wireless circuitry 24 may convey centimeter and millimeter wave signals to support relatively high data rates (e.g., because centimeter and millimeter wave signals are at relatively high frequencies between around 10 GHz and 100 GHz). However, the data rates supported by centimeter and millimeter wave signals may still be insufficient to meet all the data transfer needs of device 10. To support even higher data rates such as data rates up to 5-100 Gbps or higher, wireless circuitry 24 may convey wireless signals at frequencies greater than about 100 GHz.

As shown in FIG. 1, wireless circuitry 24 may transmit wireless signals 46 to external equipment 34 and/or may receive wireless signals 46 from external equipment 34. Wireless signals 46 may be tremendously high frequency (THF) signals (e.g., sub-THz or THz signals) at frequencies greater than around 100 GHz (e.g., between 100 GHz and 1 THz, between 80 GHz and 10 THz, between 100 GHz and 10 THz, between 100 GHz and 2 THz, between 200 GHz and 1 THz, between 300 GHz and 1 THz, between 300 GHz and 2 THz, between 70 GHz and 2 THz, between 300 GHz and 10 THz, between 100 GHz and 800 GHz, between 200 GHz and 1.5 THz, or within any desired sub-THz, THz, THF, or sub-millimeter frequency band such as a 6G frequency band), may be millimeter (mm) or centimeter (cm) wave signals between 10 GHz and around 70 GHz (e.g., 5G NR 1-R2 signals), or may be signals at frequencies less than 10 GHz (e.g., 5G NR 1-R1 signals, LTE signals, 3G signals, 2G signals, WLAN signals, Bluetooth signals, UWB signals, etc.). If desired, the high data rates supported by THF signals may be leveraged by device 10 to perform cellular telephone voice and/or data communications (e.g., while supporting spatial multiplexing to provide further data bandwidth), to perform spatial ranging operations such as radar operations to detect the presence, location, and/or velocity of objects external to device 10, to perform automotive sensing (e.g., with enhanced security), to perform health/body monitoring on a user of device 10 or another person, to perform gas or chemical detection, to form a high data rate wireless connection between device 10 and another device or peripheral device (e.g., to form a high data rate connection between a display driver on device 10 and a display that displays ultra-high resolution video), to form a remote radio head (e.g., a flexible high data rate connection), to form a THF chip-to-chip connection within device 10 that supports high data rates (e.g., where one antenna 30 on a first chip in device 10 transmits THF signals 32 to another antenna 30 on a second chip in device 10), and/or to perform any other desired high data rate operations.

In implementations where wireless circuitry 24 conveys THF signals, wireless circuitry may include electro-optical circuitry. The electro-optical circuitry may include light sources that generate first and second optical local oscillator (LO) signals. The first and second optical LO signals may be separated in frequency by the intended frequency of wireless signals 46. Wireless data may be modulated onto the first optical LO signal and one of the optical LO signals may be provided with an optical phase shift (e.g., to perform beamforming). The first and second optical LO signals may illuminate a photodiode that produces current at the frequency of wireless signals 46 when illuminated by the first and second optical LO signals. An antenna resonating element of a corresponding antenna 30 may convey the current produced by the photodiode and may radiate corresponding wireless signals 46. This is merely illustrative and, in general, wireless circuitry 24 may generate wireless signals 46 using any desired techniques.

Antennas 30 may be formed using any desired antenna structures. For example, antennas 30 may include antennas with resonating elements that are formed from loop antenna structures, patch antenna structures, inverted-F antenna structures, slot antenna structures, planar inverted-F antenna structures, helical antenna structures, monopole antennas, dipoles (e.g., planar dipole antennas such as bowtie antennas), hybrids of these designs, etc. Parasitic elements may be included in antennas 30 to adjust antenna performance.

If desired, two or more of antennas 30 may be integrated into a phased antenna array (sometimes referred to herein as a phased array antenna or an array of antenna elements). Each antenna 30 in the phased antenna array forms a respective antenna element of the phased antenna array. Each antenna 30 in the phased antenna array has a respective phase and magnitude controller that imparts the radio-frequency signals conveyed by that antenna with a respective phase and magnitude. The respective phases and magnitudes may be selected (e.g., by control circuitry 14) to configure the radio-frequency signals conveyed by the antennas 30 in the phased antenna array to constructively and destructively interfere in such a way that the radio-frequency signals collectively form a signal beam (e.g., a signal beam of wireless signals 46) oriented in a corresponding beam pointing direction (e.g., a direction of peak gain). The control circuitry may adjust the phases and magnitudes to change (steer) the orientation of the signal beam (e.g., the beam pointing direction) to point in other directions over time. This process may sometimes also be referred to herein as beamforming. Beamforming may boost the gain of wireless signals 46 to help overcome over-the-air attenuation and the signal beam may be steered over time to point towards external equipment 34 even as the position and orientation of UE device 10 changes.

As shown in FIG. 1, external equipment 34 may also include control circuitry 36 (e.g., control circuitry having similar components and/or functionality as control circuitry 14 in UE device 10) and wireless circuitry 38 (e.g., wireless circuitry having similar components and/or functionality as wireless circuitry 24 in UE device 10). Wireless circuitry 38 may include baseband circuitry 40 and transceiver 42 (e.g., transceiver circuitry having similar components and/or functionality as transceiver circuitry 28 in UE device 10) coupled to two or more antennas 44 (e.g., antennas having similar components and/or functionality as antennas 30 in UE device 10). Antennas 44 may be arranged in one or more phased antenna arrays (e.g., phased antenna arrays that perform beamforming similar to phased antenna arrays of antennas 30 on UE device 10). External equipment 34 may use wireless circuitry 38 to transmit a signal beam of wireless signals 46 to UE device 10 (e.g., as downlink (DL) signals transmitted in a downlink direction) and/or to receive a signal beam of wireless signals 46 transmitted by UE device 10 (e.g., as uplink (UL) signals transmitted in an uplink direction).

While communications at high frequencies allow for extremely high data rates (e.g., greater than 100 Gbps), wireless signals 46 at such high frequencies are subject to significant attenuation during propagation over-the-air. Integrating antennas 30 and 44 into phased antenna arrays helps to counteract this attenuation by boosting the gain of the signals within a signal beam. However, signal beams are highly directive and may require a line-of-sight (LOS) between UE device 10 and external equipment 34. If an external object is present between external equipment 34 and UE device 10, the external object may block the LOS between UE device 10 and external equipment 34, which can disrupt wireless communications using wireless signals 46. If desired, an intelligent reflecting surface may be used to allow UE device 10 and external equipment 34 to continue to communicate using wireless signals 46 even when an external object blocks the LOS between UE device 10 and external equipment 34 (or whenever direct over-the-air communications between external equipment 34 and UE device 10 otherwise exhibits less than optimal performance).

As shown in FIG. 1, system 8 may include one or more intelligent reflecting surfaces such as intelligent reflecting surface (IRS) 50. IRS 50 may sometimes also be referred to as an intelligent reconfigurable surface, an intelligent reflective surface, a reconfigurable or reflective intelligent surface (RIS), a reflective surface, or a reconfigurable surface. External equipment 34 may be separated from UE device 10 by a line-of-sight (LOS) path. In some circumstances, an external object such as object 51 may block the LOS path. Object 51 may be, for example, part of a building such as a wall, window, floor, or ceiling (e.g., when UE device 10 is located inside), furniture, a body or body part, an animal, a cubicle wall, a vehicle, a landscape feature, or other obstacles or objects that may block the LOS path between external equipment 34 and UE device 10.

In the absence of external object 51, external equipment 34 may form a corresponding signal beam of wireless signals 46 oriented in the direction of UE device 10 and UE device 10 may form a corresponding signal beam of wireless signals 46 oriented in the direction of external equipment 34. UE device 10 and external equipment 34 can then convey wireless signals 46 over their respective signal beams and the LOS path. However, the presence of external object 51 prevents wireless signals 46 from being conveyed over the LOS path.

IRS 50 may be placed or disposed within system 8 in such a way so as to allow IRS 50 to reflect wireless signals 46 between UE device 10 and external equipment 34 despite the presence of external object 51 within the LOS path. More generally, IRS 50 may be used to reflect wireless signals 46 between UE device 10 and external equipment 34 when reflection via IRS 50 offers superior radio-frequency propagation conditions relative to the LOS path regardless of the presence of external object 51 (e.g., when the LOS path between external equipment 34 and IRS 50 and the LOS path between IRS 50 and UE device 10 exhibit superior propagation/channel conditions than the direct LOS path between UE device 10 and external equipment 34). When IRS 50 is placed within system 8, external equipment 34 may transmit wireless signals 46 towards IRS 50 (e.g., within a signal beam oriented towards IRS 50 rather than towards UE device 10) and IRS 50 may reflect the wireless signals towards UE device 10, as shown by arrow 54. Conversely, UE device 10 may transmit wireless signals 46 towards IRS 50 (e.g., within a signal beam oriented towards IRS 50 rather than towards external equipment 34) and IRS 50 may reflect the wireless signals towards external equipment 34, as shown by arrow 56.

IRS 50 is an electronic device that includes a two-dimensional surface of engineered material having reconfigurable properties for performing communications between external equipment 34 and UE device 10. IRS 50 may include an array of antenna elements 48 on an underlying substrate. The substrate may be a rigid or flexible printed circuit board, a package, a plastic substrate, metamaterial, or any other desired substrate. The substrate may be planar or may be curved in one or more dimensions. If desired, the substrate and antenna elements 48 may be enclosed within a housing. The housing may be formed from materials that are transparent to wireless signals 46. If desired, IRs 50 may be disposed (e.g., layered) onto an underlying electronic device. IRS 50 may also be provided with mounting structures (e.g., adhesive, brackets, a frame, screws, pins, clips, etc.) that can be used to affix or attach IRS 50 to an underlying structure such as another electronic device, a wall, the ceiling, the floor, furniture, etc. Disposing IRS 50 on a ceiling, wall, window, column, pillar, or at or adjacent to the corner of a room (e.g., a corner where two walls intersect, where a wall intersects with the floor or ceiling, where two walls and the floor intersect, or where two walls and the ceiling intersect), as examples, may be particularly helpful in allowing IRS 50 to reflect wireless signals between external equipment 34 and UE device 10 around various objects 51 that may be present (e.g., when external equipment 34 is located outside and UE device 10 is located inside, when external equipment 34 and UE device 10 are both located inside or outside, etc.).

IRS 50 is a passive adaptively controlled reflecting surface and a powered device that includes control circuitry 52 that helps to control the operation of antenna elements 48 (e.g., one or more processors in control circuitry such as control circuitry 14). When electro-magnetic (EM) energy waves (e.g., waves of wireless signals 46) are incident on IRS 50, the wave is reflected by each antenna element 48 via re-radiation by each antenna element 48 with a respective phase and amplitude response. Antenna elements 48 may include passive reflectors (e.g., antenna resonating elements). Each antenna element 48 may include an adjustable device coupled to a corresponding antenna resonating element that is programmed, set, and/or controlled by control circuitry 52 (e.g., using a control signal that includes a respective beamforming coefficient) to configure that antenna element 48 to reflect incident EM energy with the respective phase and amplitude response. The adjustable device may be a programmable photodiode, an adjustable impedance matching circuit, an adjustable phase shifter, an adjustable amplifier, a varactor diode, an antenna tuning circuit, etc.

Control circuitry 52 on IRS 50 may configure the reflective response of antenna elements 48 on a per-element or per-group-of-elements basis (e.g., where each antenna element has a respective programmed phase and amplitude response or the antenna elements in different sets/groups of antenna elements are each programmed to share the same respective phase and amplitude response across the set/group but with different phase and amplitude responses between sets/groups). The scattering, absorption, reflection, and diffraction properties of the entire IRS can therefore be changed over time and controlled (e.g., by software running on the IRS or other devices communicably coupled to the IRS such as external equipment 34 or UE device 10). One way of achieving the per-element phase and amplitude response of antenna elements 48 is by adjusting the impedance of antenna elements 48, thereby controlling the complex reflection coefficient that determines the change in amplitude and phase of the re-radiated signal. The control circuitry 52 on IRS 50 may configure antenna elements 48 to exhibit impedances that serve to reflect wireless signals 46 incident from particular incident angles onto particular output angles. The antenna elements 48 (e.g., the antenna impedances) may be adjusted to change the angle with which incident wireless signals 46 are reflected off of IRS 50.

For example, the control circuitry on IRS 50 may configure antenna elements 48 to reflect wireless signals 46 transmitted by external equipment 34 towards UE device 10 (as shown by arrow 54) and to reflect wireless signals 46 transmitted by UE device 10 towards external equipment 34 (as shown by arrow 56). In such an example, control circuitry 36 may configure (e.g., program) a phased antenna array of antennas 44 on external equipment 34 to form a signal beam oriented towards IRS 50, control circuitry 14 may configure (e.g., program) a phased antenna array of antennas 30 on UE device 10 to form a signal beam oriented towards IRS 50, control circuitry 52 may configure (e.g., program) antenna elements 48 to receive and re-radiate (e.g., effectively reflect) wireless signals incident from the direction of external equipment 34 towards/onto the direction of UE device 10 (as shown by arrow 54), and control circuitry 52 may configure (e.g., program) antenna elements 48 to receive and re-radiate (e.g., effectively reflect) wireless signals incident from the direction of UE device 10 towards-onto the direction of external equipment 34 (as shown by arrow 56). The antenna elements may be configured using respective beamforming coefficients. Control circuitry 52 on IRS 50 may set and adjust the adjustable devices coupled to antenna elements 48 (e.g., may set and adjust the impedances of antenna elements 48) over time to reflect wireless signals 46 incident from different selected incident angles onto different selected output angles.

To minimize the cost, complexity, and power consumption of IRS 50, IRS 50 may include only the components and control circuitry required to control and operate antenna elements 48 to reflect wireless signals 46. Such components and control circuitry may include, for example, the adjustable devices of antenna elements 48 as required to change the phase and magnitude responses of antenna elements 48 (based on corresponding beamforming coefficients) and thus the direction with which IRS 50 reflects wireless signals 46. The components may include, for example, components that adjust the impedances of antenna elements 48 so that each antenna element exhibits a respective complex reflection coefficient, which determines the phase and amplitude of the reflected (re-radiated) signal produced by each antenna element (e.g., such that the signals reflected across the array constructively and destructively interfere to form a reflected signal beam in a corresponding beam pointing direction). All other components that would otherwise be present in UE device 10 or external equipment 34 may be omitted from IRS 50. For example, IRS 50 does not include baseband circuitry (e.g., baseband circuitry 26 or 40) and does not include transceiver circuitry (e.g., transceiver 42 or 28) coupled to antenna elements 48. Antenna elements 48 and IRS 50 therefore do not generate wireless data for transmission, do not synthesize radio-frequency signals for transmission, and do not receive and demodulate radio-frequency signals. IRS 50 may also be implemented without a display or user input device. In other words, the control circuitry on IRS 50 may adjust antenna elements 48 to direct and steer reflected wireless signals 46 without using antenna elements 48 to perform any data transmission or reception operations and without using antenna elements 48 to perform radio-frequency sensing operations.

This may serve to minimize the hardware cost and power consumption of IRS 50. If desired, IRS 50 may also include one or more antennas (e.g., antennas separate from the antenna elements 48 used to reflect wireless signals 46) and corresponding transceiver/baseband circuitry that uses the one or more antennas to convey control signals with external equipment 34 or UE device 10 (e.g., using a control channel plane). Such control signals may be used to coordinate the operation of IRS 50 in conjunction with external equipment 34 and/or UE device 10 but requires much lower data rates and thus much fewer processing resources and much less power than transmitting or receiving wireless signals 46. These control signals may, for example, be transmitted by UE device 10 to configure the phase and magnitude responses of antenna elements 48 (e.g., the control signals may convey beamforming coefficients). This may allow the calculation of phase and magnitude responses for antenna elements 48 to be offloaded from IRS 50, further reducing the processing resources and power required by IRS 50. In other implementations, IRS 50 may be a self-controlled IRS that includes processing circuitry for generating its own phase and magnitude responses and/or for coordinating communications among multiple UE devices (e.g., in an IRS-as-a-service configuration).

In this way, IRS 50 may help to relay wireless signals 46 between external equipment 34 and UE device 10 when object 51 blocks the LOS path between external equipment 34 and/or when the propagation conditions from external equipment 34 to IRS 50 and from IRS 50 to UE device 10 are otherwise superior to the propagation conditions from external equipment 34 to UE device 10. Just a single IRS 50 may, for example, increase signal-to-interference-plus-noise ratio (SINR) for UE device 10 by as much as +20 dB and may increase effective channel rank relative to environments without an IRS. At the same time, IRS 50 only includes processing resources and consumes power required to perform control procedures, minimizing the cost of IRS 50 and maximizing the flexibility with which IRS 50 can be placed within the environment.

In some scenarios, IRS 50 is considered by network 4 to form a network node of network 4. In these scenarios, IRS 50 is registered to network 4 so the components of network 4 (e.g., external equipment 34) are aware of the presence, location, and/or operational parameters of IRS 50 within system 8. However, when network 4 is aware of the presence of IRS 50, external equipment 34 adjusts its communications operations, scheduling, and/or beamforming based on the known presence of IRS 50 to communicate with UE device 10 via IRS 50 (e.g., by performing beamforming based on channel measurements between external equipment 34 and IRS 50). This can unnecessarily complicate communications scheduling for network 4 and can undesirably limit the channel propagation properties that are used in scheduling communications with UE device 10 (e.g., because network decisions that are made with knowledge of IRS 50 may not be optimal for the UE device(s) 10 served by the IRS, which are often better able to characterize channel propagation properties between the IRS and the UE device(s) than the network).

To mitigate these issues, IRS 50 may be a network-independent (NI) IRS that is completely transparent (e.g., unknown or invisible) to the nodes of network 4 and to external equipment 34. IRS 50 may therefore sometimes be referred to herein as NI IRS 50. To form an NI IRS, at least one IRS 50 and a UE device 10 may be logically grouped together to collectively form a single virtual UE device that communicates with external equipment 34 and network 4.

Figure 2:
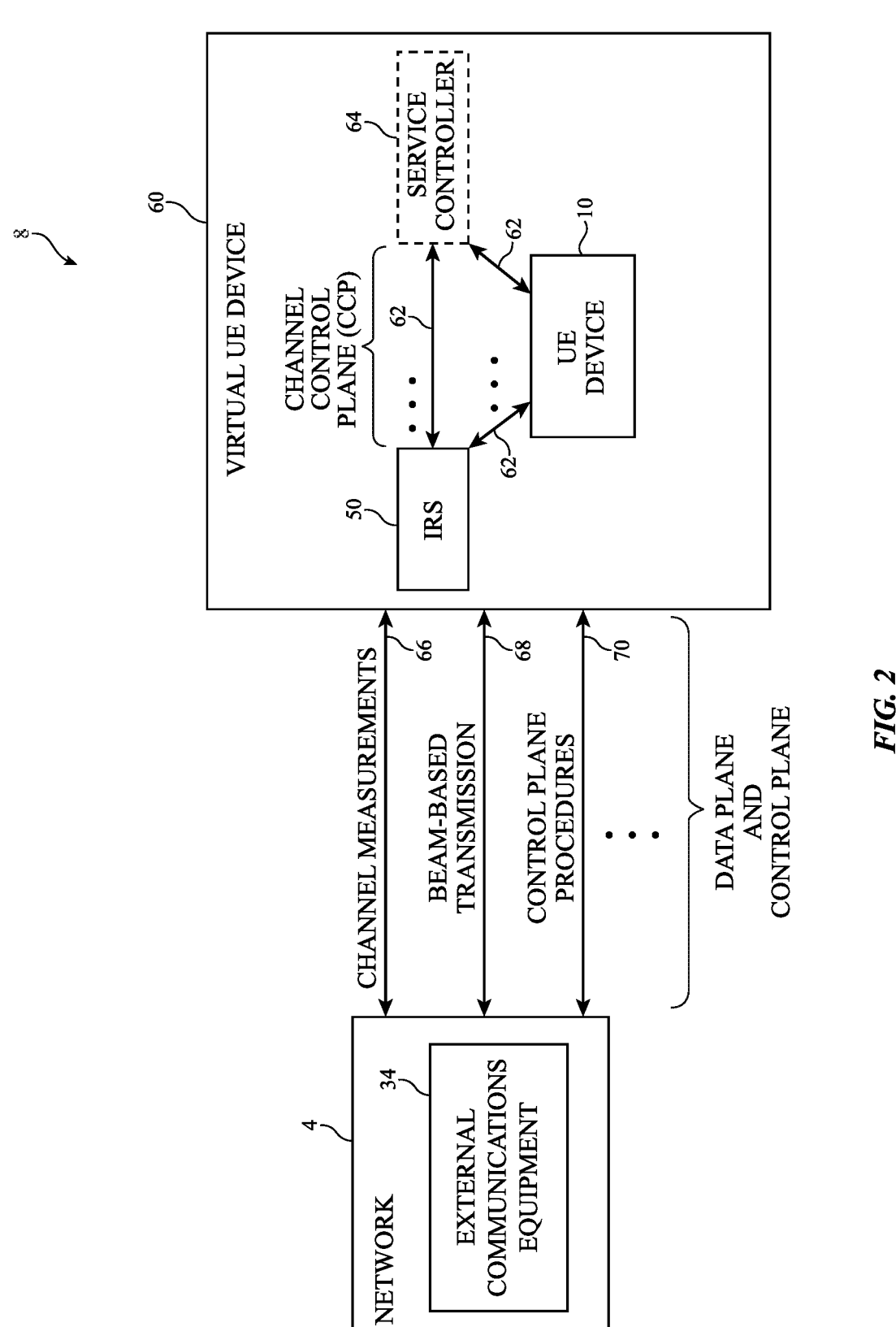
FIG. 2 is a diagram showing how a UE device and at least one network-independent IRS may logically form an illustrative virtual UE device that appears to the network as a UE device without an IRS in accordance with some embodiments.

FIG. 2 is a diagram showing how a UE device 10 and an IRS 50 may logically form a virtual UE device that communicates with network 4. As shown in FIG. 2, UE device 10 and one or more IRS 50 may logically form virtual UE device 60. UE device 10 may also include an optional service controller 64 that performs and coordinates one or more control functions of virtual UE device 60. Virtual UE device 60 may sometimes also be referred to herein as virtual UE 60, logical UE device 60, or logical UE 60. Only the UE device 10, the IRS(s) 50, and optional service controller 64 have knowledge of the existence and logical structure of virtual UE device 60, as well as of the IRS(s) 50 within virtual UE device 60.

The UE device 10 in virtual UE device 60, the IRS(s) themselves, or service controller 64 may control the IRS(s) 50 in virtual UE device 60 (e.g., to control, coordinate, and program how the IRS(s) reflect wireless signals 46 between UE device 10 and external equipment 34). External equipment 34 and network 4 have no knowledge of the IRS(s) 50 in virtual UE device 60 or the structure of virtual UE device 60 and therefore do not control the operation of the IRS(s) 50 in virtual UE device 60. Network 4 and external equipment 34 therefore interact with virtual UE device 60 as if virtual UE device 60 were the regular (physical) UE device 10 within virtual UE device 60 (e.g., external equipment 34 performs communications scheduling and beamforming with virtual UE device 60 as if virtual UE device 60 were a physical UE device 10).

For example, external equipment 34 may perform data plane and control plane functions with UE device 10 via IRS 50 as if the data plane and control plane functions were being performed directly with UE device 10, without knowledge that external equipment 34 is physically communicating with UE device 10 via IRS 50 (e.g., without any knowledge of IRS 50 whatsoever). The data plane functions may include beam-based transmissions 68 (e.g., wireless data conveyed in a signal beam of wireless signals 46 of FIG. 1). Antennas 44 on external equipment 34 may perform beamforming for beam-based transmissions 68 with virtual UE device 60 (e.g., without knowledge of IRS 50). The control plane functions may include channel measurements 66 and control plane procedures 70. In other words, external equipment 34 may perform channel measurements on virtual UE device 60 as if it were a physical UE device 10 and may perform control procedures and scheduling for virtual UE device 10 as if it were a physical UE device 10 (e.g., without knowledge of IRS 50).

While virtual UE device 60 serves as a physical UE device 10 from the perspective of network 4, the components of virtual UE device 60 are known to UE device 10, IRS(s) 50, and the optional service controller 64 within virtual UE device 60 and/or to UE device(s) and IRS(s) in one or more other virtual UE devices 60. The UE device(s) 10, the IRS(s) 50, and the optional service controller 64 in the one or more virtual UE devices 60 may communicate directly with each other (e.g., without routing communications via network 4) over network-independent (NI) communications paths (links) 62. Since the structure and components of virtual UE devices 60 are transparent (invisible) to network 4, the control functions that are carried out via NI communications paths 62 are not covered by the traditional network data plane or control plane used by external equipment 34. Instead, a separate, dedicated control channel plane (CCP) is defined for supporting NI communications paths 62 (e.g., communications over NI communications paths 62 are performed over the CCP).

The CCP may be responsible for the exchange of control information between the UE device(s) 10 and the IRS(s) 50 within one or more virtual UE devices 60 and may allow for superior propagation quality for the UE device(s) 10 than in scenarios where the IRS(s) 50 are known to network 4. Unlike the existing data plane and control plane used by external equipment 34, the CCP does not involve the use of base stations, access points, or core network functionality. The CCP may utilize resources and/or policies on one or more underlying layers. The CCP may be implemented using a dedicated or proprietary protocol or may be integrated into the wireless standard of one or more existing protocols. For 5G networks, the CCP may, for example, utilize unlicensed spectrum that allows UE devices 10 from different cellular network providers to communicate with each other. For 6G networks, the CCP may, for example, use a sidelink to improve reliability and latency delays (e.g., as a use case for a subnetwork protocol design). In other words, the components of virtual UE device(s) 60 may use the CCP to coordinate communications within and between virtual UE device(s) 60 to optimize the channel propagation characteristics for the UE device(s) 10 within the virtual UE device(s) 60 in communicating with network 4 via one or more IRS(s) 50, while concurrently allowing the structure and devices within virtual UE device(s) 60 to remain transparent to network 4 (e.g., transparent to the control plane and data plane functions performed by external equipment 34).

The example of FIG. 2 is merely illustrative. System 8 may include multiple virtual UE devices 60 (e.g., each having a respective UE device 10). The components of the virtual UE devices may communicate with each other using NI communications paths 62 and the CCP. In general, each virtual UE device 60 may include any desired number of IRS(s) 50. Service controller 64 may be omitted if desired. Service controller 64 may be implemented on one or more electronic devices and may include one or more processors that perform the operations of service controller 64 as described herein. If desired, one or more IRS's 50 may concurrently form part of multiple different virtual UE devices 60.

Figure 3:
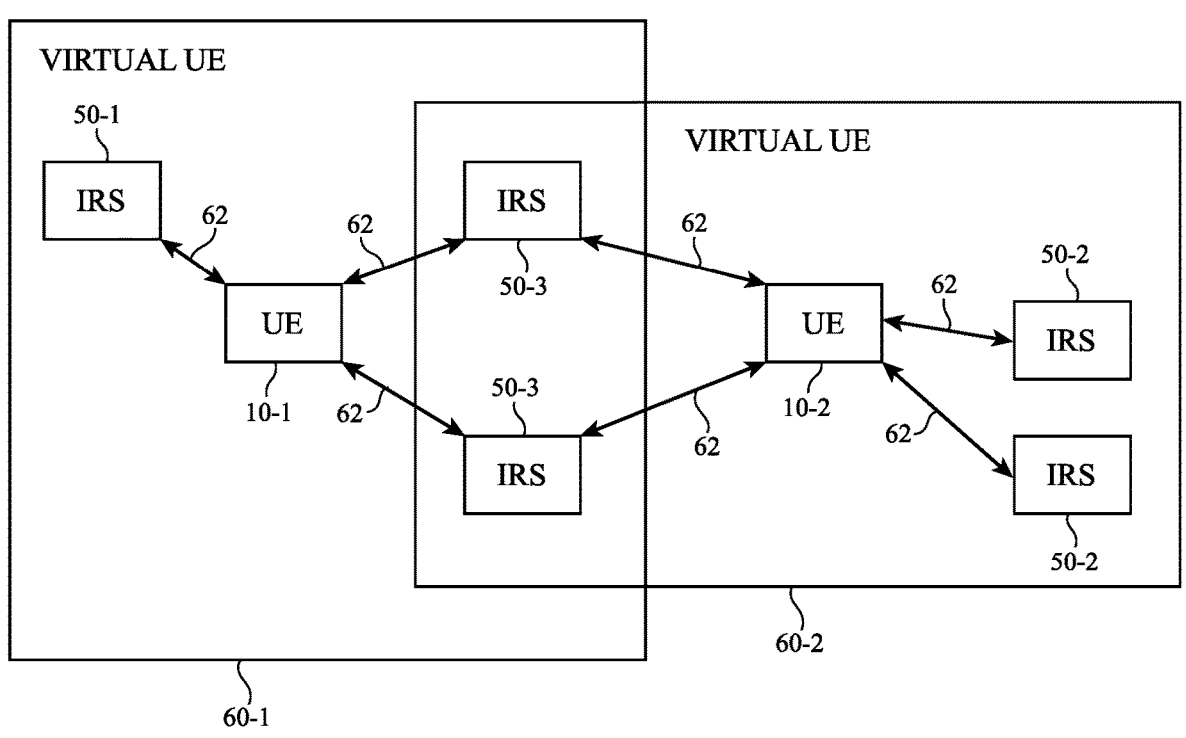
FIG. 3 is a diagram showing how an illustrative network-independent IRS may concurrently form part of two different virtual UE devices in accordance with some embodiments.

FIG. 3 is a diagram showing one example of how IRS's 50 may concurrently form part of multiple different virtual UE devices 60. As shown in FIG. 3, a first virtual UE device 60-1 may be defined for a first UE device 10-1 and a second virtual UE device 60-2 may be defined for a second UE device 10-2. First virtual UE device 60-1 and second virtual UE device 60-2 may both include one or more IRS(s) 50-3 (e.g., IRS(s) 50-3 may be shared by virtual UE devices 60-1 and 60-2). First virtual UE device 60-1 may also include one or more IRS's 50-1 that does not form a part of second virtual UE device 60-2. Second virtual UE device 60-2 may include one or more IRS's 50-2 that does not form a part of first virtual UE device 60-1. UE device 10-1 may communicate with each IRS 50 in virtual UE device 60-1 and one or more components of second virtual UE device 60-2 using NI communications paths 62 and the CCP (e.g., for performing control functions). Similarly, UE device 10-2 may communicate with each IRS 50 in virtual UE device 60-2 and one or more components of first virtual UE device 60-1 using NI communications paths 62 and the CCP (e.g., for performing control functions).

Figure 4:
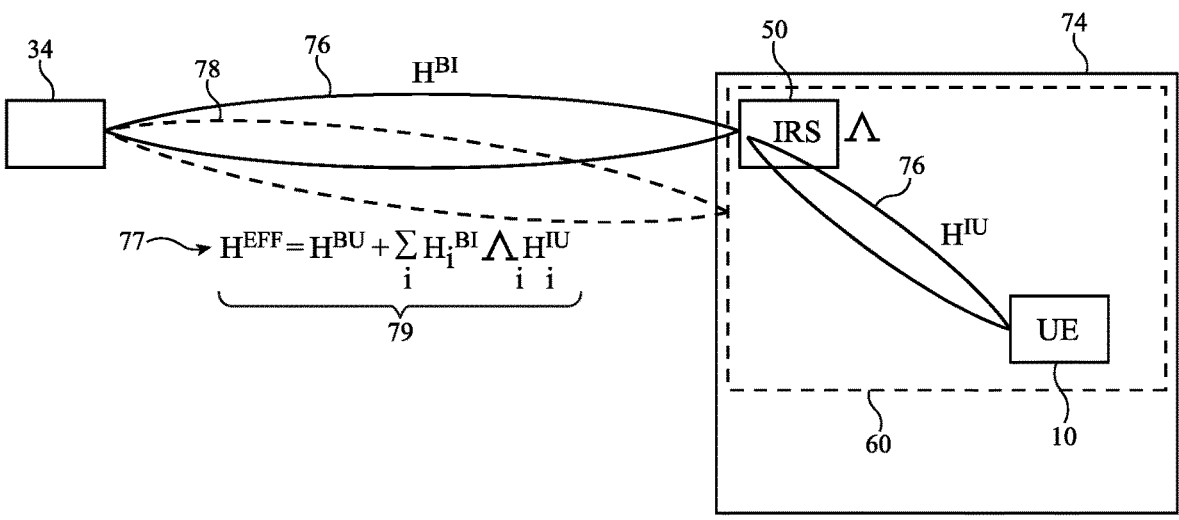
FIG. 4 is a diagram showing how signals conveyed between the network and a virtual UE device may be characterized by channel coefficients in accordance with some embodiments.

FIG. 4 is a diagram of an illustrative environment 72 having virtual UE device 60 and external equipment 34. As shown in FIG. 4, UE device 10 and IRS 50 may form a virtual UE device 60. Virtual UE device 60 may be located within a building 74 or elsewhere in environment 72. IRS 50 may, for example, be mounted within building 74 at a location that allows IRS 50 to reflect wireless signals between external equipment 34 (outside of building 74) and UE device 10 (within building 74).

When reflecting wireless signals between external equipment 34 and UE device 10, IRS 50 may reflect a signal beam 76 (e.g., a beam of wireless signals 46 of FIG. 1) between the location of external equipment 45 and the location of UE device 10. Signal beam 76 may include a first portion between external equipment 34 and IRS 50 and a second portion between IRS 50 and UE device 10. Antenna elements 48 on IRS 50 may be programed to impart selected phases and magnitudes to signals incident within a beam from external equipment 34 such that the re-radiated signals effectively reflect within a beam oriented towards UE device 10 (and vice versa).

The channel conditions associated with the path between IRS 50 and UE device 10 may be characterized by a channel matrix $H^{IU}$. The channel conditions associated with the path between IRS 50 and external equipment 34 may be characterized by a channel matrix $H^{BI}$. The channel conditions associated with the path between UE device 10 and external equipment 34 may be characterized by a channel matrix $H^{BU}$. The configuration of antenna elements 48 on IRS 50 (FIG. 1) may be characterized by a matrix $\Lambda$, which includes reflection coefficients or phase shift coefficients (e.g., beamforming coefficients) for the antenna elements.

Since IRS 50 is transparent to the network, external equipment 34 may operate under the assumption that external equipment 34 is communicating with a physical UE device that is actually formed from virtual UE device 60 (e.g., over an effective beam 78 between external equipment 34 and virtual UE device 60). The channel conditions of effective beam 78 may be characterized by the channel matrix $H^{EFF}$, which is defined by equation 77. The channel matrices are matrices of channel coefficients that external equipment 34 needs to know to perform beamforming and signal transmission with UE device 10 and vice versa. External equipment 34 may generate channel that estimates channel matrix $H^{EFF}$ (e.g., may measure the elements of channel matrix $H^{EFF}$) but in general has no knowledge of portion 79 of equation 77 because external equipment 34 has no knowledge of IRS 50 or the structure of virtual UE device 60. External equipment 34 may then use channel matrix $H^{EFF}$ to perform its own transmissions and beamforming in communicating with UE device 10.

Portion 79 of equation 77 defines the channel conditions of the cascaded channel between UE device 10 and external equipment 34 via one or more IRS's 50. UE device 10 may estimate (measure) the elements of portion 79 of equation 77 (e.g., while performing its own channel measurements and processing operations) and may use portion 79 of equation 77 to control its own transmission and beamforming, as well as the phase and magnitude (beamforming) settings for IRS 50. In this way, IRS 50 remains transparent to the network and UE device 10 and the network is only able to measure the effective channel characterized by channel matrix $H^{EFF}$, while UE device 10 is able to perform channel measurements and make communications decisions based on portion 79 of equation 77, which may result in improved propagation performance in communicating with external equipment 34 relative to scenarios where IRS 50 is known to the network.

In general, the IRS(s) 50 in a virtual UE device 60 are controllable in a network-independent manner by one of three entities. A given IRS 50 may control itself (e.g., as a self-controlled IRS), a given UE device 10 may control IRS 50 (e.g., using the CCP), or service controller 64 may control IRS 50 (e.g., using the CCP). Controlling IRS 50 may involve scheduling communications with IRS 50, measuring or estimating the channel conditions for IRS 50, generating beamforming coefficients (e.g., phase and magnitude settings for antenna elements 48) for IRS 50 (e.g., based on the measured channel conditions), and/or any other desired control operations that would otherwise be performed by network 4 in implementations where the IRS is not a network independent IRS. Using a given UE device 10 to control IRS 50 (sometimes referred to herein as a primary UE device, a controlling UE device, or a master UE device) may allow for minimal power consumption at IRS 50, but only works in the presence of a UE device 10 with the implemented functionality. On the other hand, using a self-controlled IRS 50 may consume more power but may allow for more flexibility (e.g., the self-controlled IRS may serve all UEs that support the protocol).

In some examples, IRS 50 may be owned or operated by the user of a given UE device 10 (e.g., for use in a private or home space). These examples may be particularly suited to using UE device 10 to control the IRS (e.g., to minimize power consumption and cost of the IRS). Since IRS 50 is network independent, the IRS can service multiple bands (including non-licensed bands) and does not depend on the choice of mobile operator. In other examples, IRS 50 may be owned or operated by an enterprise (e.g., a café, hotel, library, hair salon, university, etc.). These configurations may sometimes be referred to herein as IRS-as-a-service configurations. In IRS-as-a-service configurations, the IRS may be provided for one or more UE devices 10 to use as a service (e.g., for free or for a fee). In these examples, service controller 64 may be operated by the enterprise and may be used to control IRS 50, for example. The service controller may serve all UE devices supporting the protocol of the CCP, for example.

FIG. 5 is a flow chart of illustrative operations involved in using the CCP to establish and operate one or more virtual UE devices using one or more UE devices, one or more network-independent IRS's, and optionally a service controller. At operation 80, the CCP may be used to discover and establish communications between one or more UE devices 10, one or more IRS's 50, and optionally service controller 64. The CCP communications may serve to initialize and establish one or more virtual UE devices 60 over the underlying UE device(s) 10 and IRS(s) 50. The components of the virtual UE device(s) 60 may be aware of the existence and structure of the virtual UE device(s) 60 but this information may be transparent to network 4. The CCP may, if desired, be used by the UE device(s) 10 to discover and identify one or more neighboring UE device(s) 10 (e.g., UE devices of other virtual UE devices) and/or to discover and identify one or more neighboring IRS(s) 50.

At operation 82, the CCP may be used to coordinate the generation of control information associated with the IRS(s) 50, UE device(s) 10, and optionally the service controller 64 in the virtual UE device(s) 60. The control information may include, for example, channel state information, channel measurements, phase and magnitude settings (e.g., beamforming coefficients) for the UE device(s) 10 and the IRS(s) 50 in the virtual UE device(s) 60, scheduling information, etc. The control information and the CCP may be used to configure the UE device(s) 10 and/or the IRS(s) 50 within the virtual UE device(s) 60.

As shown in FIG. 5, the UE device(s) 10, IRS(s) 50, and optionally service controller 64 may perform one or more of operations 84-96 using the CCP. Two or more of operations 84-96 may be performed concurrently. Operations 84-96 may be performed in any desired order. One or more of operations 84-96 may be omitted.

At operation 84, the UE device(s) 10 in virtual UE device(s) 60 may perform synchronization with each other (UE-UE synchronization) over the CCP. The UE device(s) 10 in virtual UE device(s) 60 may additionally or alternatively perform synchronization with the IRS(s) 50 in virtual UE device(s) 50 over the CCP. In this way, the CCP may be used to synchronize timing across the virtual UE device(s) 60. As a part of the synchronization procedure, a given UE device 10 may use the CCP to discover and identify an IRS 50 that belongs to a different UE device 10, as one example.

At operation 86, the components of virtual UE device(s) 60 may use the CCP to select a primary UE device 10 for each IRS 50 in the virtual UE device(s) 60 (e.g., using a master/primary device selection/election procedure). Operation 86 may, for example, be performed for each IRS that is not a self-controlled IRS and that is not controlled by service controller 64. If desired, the primary UE device(s) 10 may be selected based on a priority. For example, UE device(s) 10 having higher power level, higher charging status, shorter distances to the IRS 50, or less pathloss to the IRS 50 may have higher priority than UE device(s) 10 having lower power level, lower charging status, a longer distance to the IRS 50, or more pathloss to the IRS 50. The UE device 10 having the highest priority for each IRS 50 may be selected (elected) as the primary UE device for that IRS and may thereafter be used to control the IRS until another primary UE device is selected. Priority may, for example, be periodically updated. The CCP may be used to share the priority (or information used to identify priority) between the UE device(s) 10 in virtual UE device(s) 60 and UE device(s) 10 may use the shared information to elect or select the primary UE device(s) 10 (e.g., in a decentralized manner). If desired, the CCP may introduce an offset to avoid ping-pong issues (e.g., where a new primary UE device is only selected when it exhibits a significantly higher priority metric than the previous primary UE device for a given IRS 50). The primary UE device(s) 10 may be used to control IRS(s) 50 over the CCP.

At operation 88, for IRS's 50 that are not self-controlled IRS's, the primary UE device(s) 10 or service controller 64 may select and schedule one or more physical interfaces or RATs for use with the CCP. The primary UE device(s) 10 or service controller 64 may use the CCP to inform the other UE device(s) 10 in virtual UE device 60 (e.g., non-primary UE devices 10, sometimes referred to herein as secondary UE devices 10) about the selected physical interface (RAT) and the corresponding scheduling to use for the CCP. The selection of physical interface may be based on the type of data to be conveyed over the corresponding NI communications path 62, for example.

At operation 90, the primary UE device(s) 10 or service controller 64 may use the CCP to transmit control information to the other UE device(s) 10 in virtual UE device(s) 60. For example, the primary UE device(s) 10 or service controller 64 may use the CCP to transmit cellular configuration parameters, scheduling information, and/or channel data to the other UE device(s) 10. The cellular configuration parameters may include control information associated with communications with external equipment 34 such as band information (e.g., information identifying one or more frequency bands to be used), information about the type of serving base station in external equipment 34, frame and numerology information (e.g., associated with the modulation of wireless signals 46), channel state information reference signal (CSI-RS) and sounding reference signal (SRS) configuration information, and/or a bandwidth part (BWP) configuration. The scheduling information may include scheduling data (e.g., uplink grants, uplink requests, etc.), semi-persistent scheduling information, UE expectations on traffic (e.g., radio link control (RLC) or packet data convergence protocol (PDCP) waits a packet), or other information associated with scheduling of communications between UE device(s) 10 and external equipment 34.

If desired, the CCP may be used to convey channel data between UE devices 10 and optionally service controller 64. The channel data may include channel measurements performed by UE device(s) 10 and/or service controller 64. In general, UE device(s) 10 may periodically (or upon request via the CCP from the master UE device(s) 10 or service controller 64) measure the cascaded channel associated with each IRS 50 (e.g., UE device(s) 10 may measure portion 79 of equation 77 of FIG. 4 for each IRS 50 in virtual UE device(s) 60). As an example, the UE devices may measure channel matrices H$^{BU}$ and H$^{BI}$ for each IRS 50 jointly based on CSI-RS measurements in portion 79 of equation 77. If desired, the most dynamic part of the channel can be estimated with the help of sidelink-based sensing (e.g., a sidelink resource may be used for UE sensing). This procedure may run when a UE device 10 has no data to transmit or receive. The UE may play the role of a radar where IRS 50 is considered as a passive scatterer during the procedure. The CCP may then be used to share the channel measurements (e.g., the measured channel matrices) between the UE device(s) 10 in virtual UE device(s) 60 for use in subsequent communications decisions.

At operation 92, the primary UE device(s) 10 or service controller 64 may use the CCP to transmit control information to the IRS(s) 50 in virtual UE device(s) 690. For example, the primary UE device(s) 10 or service controller 64 may use the CCP to schedule IRS-UE channel measurements to IRS(s) 50 and/or other UE device(s) 10 (e.g., to control the timing with which UE device(s) 10 and/or IRS(s) 50 perform channel measurements for portion 79 of equation 77 of FIG. 4). The primary UE device(s) 10 or service controller 64 may transmit scheduling information to IRS(s) 50 over the CCP.

The primary UE device(s) 10 or service controller 64 may generate (e.g., calculate, compute, etc.) beamforming coefficients for the IRS(s) 50 in virtual UE device 60 based on the channel measurements gathered by the UE device(s) 10 and/or IRS(s) 50 (and as received by the primary UE device(s) 10 or service controller 64 over the CCP). The beamforming coefficients may be settings for the antenna elements 48 in each IRS 50 in virtual UE device(s) 60 that configure the antenna elements to impart reflected radio-frequency signals with selected phases and magnitudes, thereby steering the incident angles and output angles with which the IRS reflects wireless signals 46 between external equipment 34 and UE device(s) 10 (FIG. 1). Additionally or alternatively, the primary UE device(s) 10 or service controller 64 may use the CCP to initiate or distribute calculation responsibilities for the beamforming coefficients onto other UE device(s) 10. The CCP may then be used to provide the corresponding beamforming coefficients to each IRS 50 in virtual UE device(s) 60. In other words, the CCP may be used to calculate, configure, and program the antenna elements 48 in each IRS 50 to reflect radio-frequency signals between the UE device(s) 10 in virtual UE device(s) 60 and external equipment 50.

IRS beamforming and resource allocation may be performed over the CCP in a centralized or decentralized procedure. In the centralized procedure, the primary UE device(s) 10 or service controller 64 may use the CCP to request channel data generated by other UE devices 10 characterizing the IRS-UE channel between the UE device(s) 10 and each IRS 50. Each requested UE device 10 may then send its most recent channel measurements (e.g., measured channel matrices) to the master UE device(s) 10 or service controller 64 over the CCP. The master UE device(s) 10 or service controller 64 may then calculate the beamforming coefficients for each IRS 50 based on the received channel measurements and may transmit the beamforming coefficients to the corresponding IRS(s) 50 using the CCP. In the decentralized procedure, the master UE device(s) 10 or service controller 64 may decide which UE device(s) 10 are to gather channel measurements and compute beamforming coefficients for each IRS 50 and may use the CCP to instruct those UE device(s) 10 to gather channel measurements and compute beamforming coefficients. The instructed UE device(s) 10 may then gather channel measurements and may generate (e.g., calculate) the beamforming coefficients for the corresponding IRS 50 based on the gathered channel measurements. The instructed UE device(s) 10 may then use the CCP to transmit the beamforming coefficients to the primary UE device(s) 10 or service controller 64. The primary UE device(s) 10 or service controller 64 may then use the CCP to provide the beamforming coefficients calculated by UE device(s) 10 to the corresponding IRS(s) 50.

When the master UE device(s) 10 or service controller 64 allocate resources (e.g., during calculation of the beamforming coefficients in the centralized procedure or while deciding which UE devices 10 should perform channel measurements and beamforming coefficient calculation in the decentralized procedure), the master UE device(s) 10 or service controller 64 may take into account the traffic expectations from the controlled UE device(s) 10, delay requirements, historical rates, etc. A simplest solution for the resource allocation may be to split IRS(s) 50 equally between UE devices 10. At the same time, fairness should be considered. For example, a fairness metric may be defined for each UE device and the fairness metric may be optimized to select the appropriate resource allocation. Other optimization targets may also be considered (e.g., targeting perceived throughput maximization, specific QoS, etc.). The beamforming coefficient calculation method may depend on the resolution of the phase shift coefficients at IRS(s) 50. If only discrete phase shifts are allowed, a greedy approach may be adopted for coefficient selection. If the decentralized procedure is used, UE devices 10 are able to perform joint beamforming calculation and partial channel estimation to reduce computational and pilot overhead. The codebook of IRS 50 (e.g., the codebook storing beamforming coefficients for antenna elements 48) may be desired to reduce communication overhead between IRS 50 and UE device 10.

In examples where virtual UE device(s) 60 include a self-controlled IRS 50, at operation 94, the self-controlled IRS 50 may perform IRS-UE channel measurements (e.g., channel measurements characterizing propagation between the IRS and the UE device) itself, may generate (e.g., calculate) its own beamforming coefficients based on its IRS-UE channel measurements or based on IRS-UE channel measurements received from UE device(s) 10 over the CCP, and/or may use the CCP to inform UE device(s) 10 and/or service controller 64 of its IRS-UE channel measurements and/or its generated beamforming coefficients. If virtual UE device(s) 60 do not include a self-controlled IRS, operation 94 may be omitted.

At operation 96, one or more UE devices 10 and/or one or more IRS's 50 may perform sensing operations using the CCP. The sensing operations may include an active sensing procedure for IRS channel estimation and/or simultaneous localization and mapping (SLAM) assistance, as examples.

In summary, the CCP may be used to perform many control operations associated with the operation of virtual UE device 60 independent of network 4. For example, the CCP may include an interface for UE-UE synchronization (at operation 84), UE-IRS synchronization (at operation 84), and a primary UE selection procedure (at operation 88). The CCP may be used by the primary UE device(s) 10 or service controller 64 to schedule CCP procedures within its neighborhood/vicinity (e.g., at operations 90-92). The logic of the CCP is abstracted from the physical technology used to implement the CCP. The primary UE device(s) 10 or service controller 64 may select and schedule a physical interface for performing these control operations over the CCP (at operation 88).

Physically, the CCP may use a number of different underlying interfaces or RATs. For example, the CCP may be implemented using cellular sidelink, UWB, Wi-Fi Direct, and/or Bluetooth. The primary UE device(s) 10 and/or service controller 64 may assign different physical interfaces (RATs) to use for each NI communications path 62 in virtual UE device(s) 60 based on the type of control procedure to be performed by the CCP over that NI communications path 62. Certain control procedures may involve different types of data transmissions that may be more suitable for some physical methodologies than others.

For example, the CCP may be used to send small message transmissions between UE devices 10 (e.g., over NI communications paths 62 between UE devices 10). Such small message UE-UE transmissions may include synchronization information, data requests, scheduling information, configuration data, and optionally acknowledgements, as examples. Any of the physical interfaces (e.g., cellular sidelink, UWB, Wi-Fi Direct, and/or Bluetooth) may be selected to support these types of transmissions (e.g., at operation 88).

The CCP may also be used to send large data chunk transmissions between UE devices 10 (e.g., over NI communications paths 62 between UE devices 10). Such large data chunk UE-UE transmissions may include channel data (e.g., channel measurements, channel matrices, etc.), traffic expectation information, and optionally partial beamforming coefficients, as examples. The cellular sidelink, UWB, or Wi-Fi Direct may be selected to support these types of transmissions, for example (e.g., these NI communications paths may operate physically using cellular sidelink, UWB, or Wi-Fi Direct to perform the logical operations of the CCP in transmitting large data chunks between UE device(s) 10 and IRS(s) 50).

The CCP may also be used to send small message transmissions between UE device(s) 10 and IRS(s) 50 (e.g., over NI communications paths 62 between UE device(s) 10 and IRS(s) 50). Such small message UE-IRS transmissions may include synchronization and scheduling information, as examples. UWB or Bluetooth may be selected to support these types of transmissions, for example (e.g., these NI communications paths may operate physically using UWB or Bluetooth to perform the logical operations of the CCP in transmitting small messages between UE device(s) 10 and IRS(s) 50).

The CCP may also be used to send large data chunks between UE device(s) 10 and IRS(s) 50. Such large data chunks may include beamforming coefficients (e.g., as generated at operations 92-94). UWB or Bluetooth may be selected to support these types of transmissions, for example (e.g., these NI communications paths may operate physically using UWB or Bluetooth to perform the logical operations of the CCP in transmitting large data chunks between UE device(s) 10 and IRS(s) 50).

The CCP may also be used to send small message transmissions from IRS(s) 50 to UE device(s) 10. Such small message transmissions may include synchronization messages and optionally acknowledgments. The CCP may also be used to perform active sensing for a SLAM procedure. Any of the physical interfaces (e.g., cellular sidelink, UWB, Wi-Fi Direct, and/or Bluetooth) may be selected to support these types of transmissions (e.g., at operation 88). UE active sensing for channel estimation may be performed using the cellular sidelink, as an example.

At operation 98, the UE device(s) 10 in virtual UE device(s) 60 may convey wireless signals 46 with external equipment 34 via one or more of the IRS's 50 in virtual UE device(s) 60 (e.g., while the components of virtual UE device(s) 60 are configured using the CCP and the control information of operation 82). The IRS's 50 may, for example, reflect wireless signals 46 (FIG. 1) between UE device(s) 10 and external equipment 34 while programed using the beamforming coefficients generated while processing operation 82. Operating IRS(s) 50 independent of network 4 in this way (e.g., via the CCP established across the virtual UE device(s) 60) may improve the channel propagation properties for the UE device(s) 10 relative to implementations where the IRS(s) are not network independent. Processing may loop back to operation 80 (e.g., as more virtual UE devices 60 are defined) or operation 82 (e.g., to update the configuration of the components of virtual UE device(s) 60 (e.g., the beamforming coefficients used by IRS(s) 50) as needed over time (e.g., as the channel conditions for UE device(s) 10 change over time.

FIG. 6 is a flow chart of illustrative operations that may be performed by external equipment 34 in communicating with UE device(s) 10. The operations of FIG. 6 may, for example, be performed concurrently with the operations of FIG. 5. External equipment 34 has no knowledge of the presence of IRS(s) 50 or the structure of virtual UE device(s) 60 and operates as if each virtual UE device 60 is a physical UE device 10.

At operation 100, external equipment 34 may generate channel measurements associated with the effective channel(s) between virtual UE device(s) 60 and external equipment 34. For example, external equipment 34 may generate (e.g., measure, calculate, etc.) channel matrix $H^{EFF}$ (e.g., without any insight into portion 79 in formula 77 of FIG. 4) for each virtual UE device 60 (e.g., the channel matrices associated with the channel between external equipment 34 and each virtual UE device 60).

At operation 102, external equipment 34 may communicate with UE device(s) 10 via IRS(s) 50 based on the effective channel measurements gathered at operation 100. For example, external equipment 34 may update the beamforming of its antennas 44 based on the generated channel matrices $H^{EFF}$. As external equipment 34 has no knowledge of IRS(s) 50, the beamforming is performed based on the channel between external equipment 46 and virtual UE device(s) 60 rather than between external equipment 46 and IRS(s) 50. The communications conveyed between external equipment 34 and UE device(s) 10 may include data plane and control plane functions (signals). Communications may proceed normally from the perspective of the network as if each virtual UE device 10 is itself a physical UE device 10.

Figure 7:
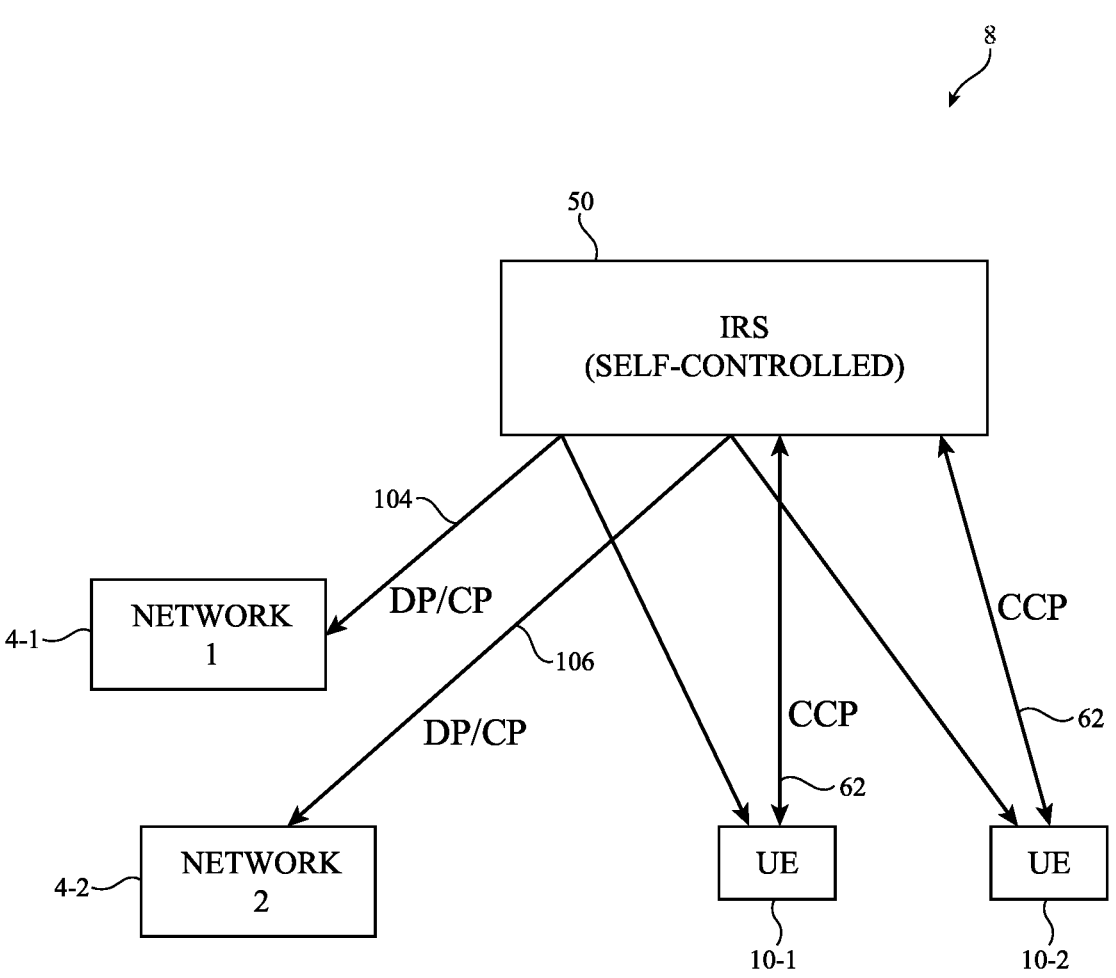
FIG. 7 is a diagram showing how an illustrative self-controlled network-independent IRS may reflect signals between multiple UE devices and respective networks in accordance with some embodiments.

The example of FIGS. 1-6 in which UE devices 10 communicate with a single network 4 is merely illustrative. If desired, UE devices 10 and IRS(s) 50 may communicate with multiple networks 4. FIG. 7 is a diagram showing how an illustrative self-controlled network-independent IRS 50 may reflect signals between multiple UE devices 10 and respective networks in an arrangement where IRS 50 operates as an IRS-as-a-service for multiple UE devices 10. As shown in FIG. 7, system 8 may include an IRS 50 that is self-controlled. IRS 50 may reflect signals for a first network 4-1 (e.g., a network owned or operated by a first cellular telephone provider or carrier) and for a second network 4-1 (e.g., a network owned or operated by a second cellular telephone provider or carrier).

Some UE devices such as UE device 10-1 may be a subscriber to network 4-1 whereas other UE devices such as UE device 10-2 may be a subscriber to network 4-2. IRS 50 may generate its own beamforming coefficients (e.g., at operation 94 of FIG. 5) that configure IRS 50 to reflect data plane (DP) and control plane (CP) signals 104 between network 4-1 and UE device 10-1 while concurrently reflecting data plane and control plane signals between network 4-2 and UE device 10-1. IRS 50 may provide this service to UE devices 10-1 and 10-2 for free or for a fee. The CCP and NI communications paths 62 may be used to coordinate and control communications between IRS 50 and UE devices 10-1 and 10-2 (e.g., within two corresponding virtual UE devices, a first that includes UE device 10-1 and IRS 50 and a second that includes UE device 10-2 and IRS 50). The CCP and NI communications paths 62 may be used to verify access to the IRS(s) for each UE device, to register UE devices to use the IRS-as-a-service, coordinate service billing, authenticate UE devices, etc. In this way, IRS 50 may enhance service quality for users of different cellular networks.

Figure 8:
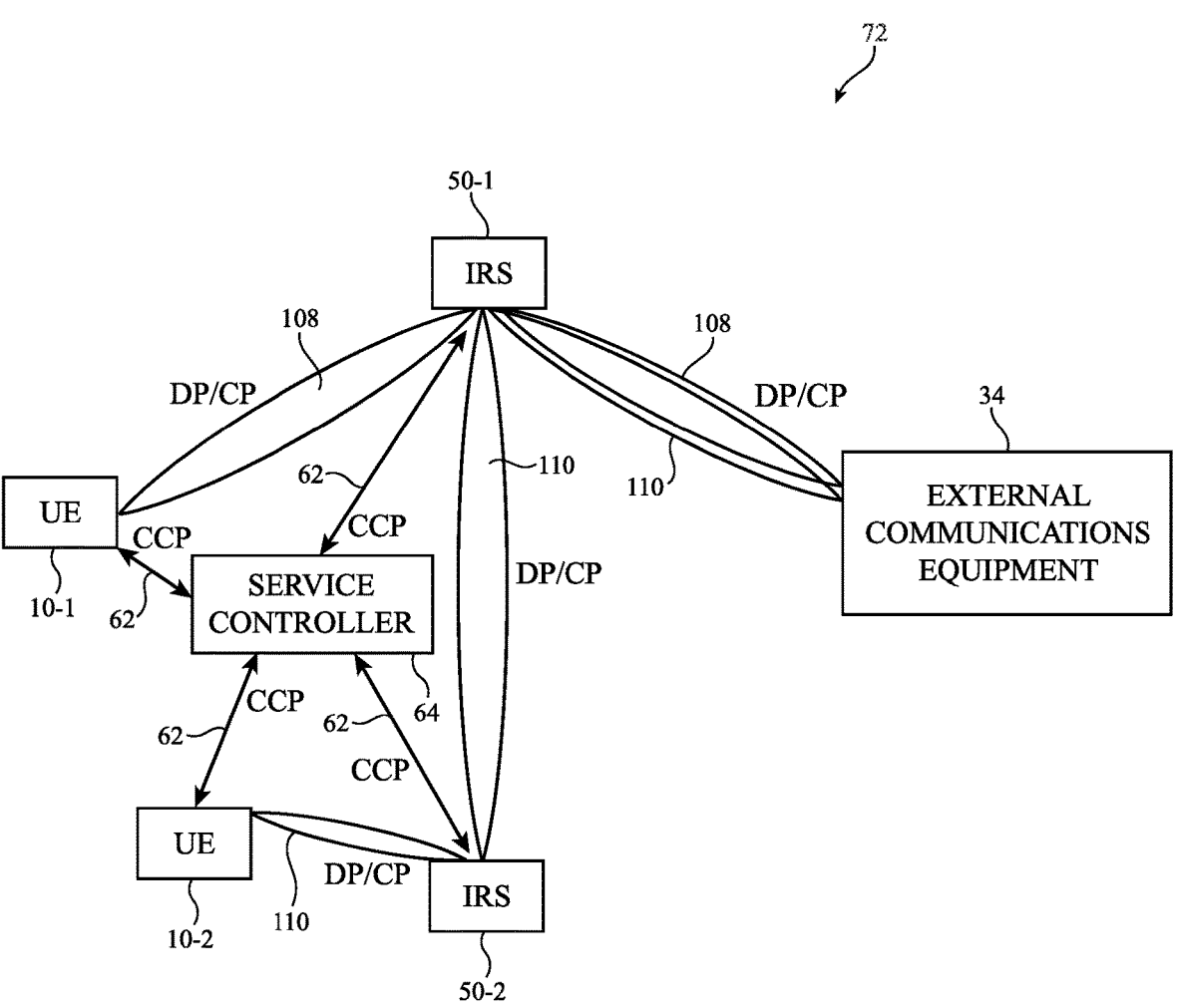
FIG. 8 is a diagram showing how a service controller may use the CCP to control multiple network-independent IRS's to reflect signals between external communications equipment and multiple UE devices in accordance with some embodiments.

FIG. 8 is a diagram showing how an illustrative service controller 64 may control multiple IRS's 50 to provide service to multiple UE devices 10 (e.g., in an arrangement where IRS 50 operates as an IRS-as-a-service for multiple UE devices 10). As shown in FIG. 8, environment 72 may include a service controller 64, a first IRS 50-1, a second IRS 50-2, a first UE device 10-1, and a second UE device 10-2 (e.g., a first virtual UE device that includes UE device 10-1 and IRS 50-1 and a second virtual UE device that includes UE device 10-2, IRS 50-1, and IRS 50-2). Service controller 64 may coordinate and control communications between UE devices 10-1 and 10-2 and external equipment 34 via IRS's 50-1 and 50-2 using the CCP and NI communications paths 62.

Service controller 64 may implement CCP functionality inside a cluster of IRS's 50. The service controller may be independent of the network and may be operated by an enterprise or other service provider that is also in control of IRS's 50-1 and 50-2. As shown in FIG. 8, service controller 64 may use the CCP to control IRS 50-1 to reflect wireless signals 46 (FIG. 1) between UE device 10-1 and external equipment 34 (e.g., as shown by reflected beam 108). Service controller 64 may, for example, program IRS 50-1 using beamforming coefficients that configure the antenna elements of IRS 50-1 to form reflected beam 108 for wireless signals transmitted by UE device 10-1 and external equipment 34. Reflected beam 108 may be used to perform data plane and/or control plane functions for communications between UE device 10-1 and external equipment 34.

If desired, multiple IRS's 50 may be cascaded to provide service for a given UE device 10. For example, IRS 50-1 and IRS 50-2 may be cascaded to provide service for UE device 10-2. As shown in FIG. 8, service controller 64 may use the CCP to control IRS 50-1 and IRS 10-2 to reflect wireless signals 46 (FIG. 1) between UE device 10-2 and external equipment 34 (e.g., as shown by twice-reflected beam 110). Service controller 64 may, for example, program IRS 50-1 using beamforming coefficients that configure the antenna elements of IRS 50-1 to form reflected beam 110 for wireless signals incident from IRS 50-2 and external equipment 34. Service controller 64 may concurrently program IRS 50-2 using beamforming coefficients that configure the antenna elements of IRS 50-2 to form reflected beam 110 for wireless signals incident from UE device 10-2 and IRS 50-1. This may configure IRS 50-2 to reflect signals transmitted by UE device 10-2 towards IRS 50-1, which is configured to reflect signals received from IRS 50-2 towards external equipment 34 and vice versa. Reflected beam 110 may be used to perform data plane and/or control plane functions for communications between UE device 10-1 and external equipment 34. In general, any desired number of IRS's 50 may be cascaded to reflect communications between a given UE device 10 and external equipment 34.

Figure 9:
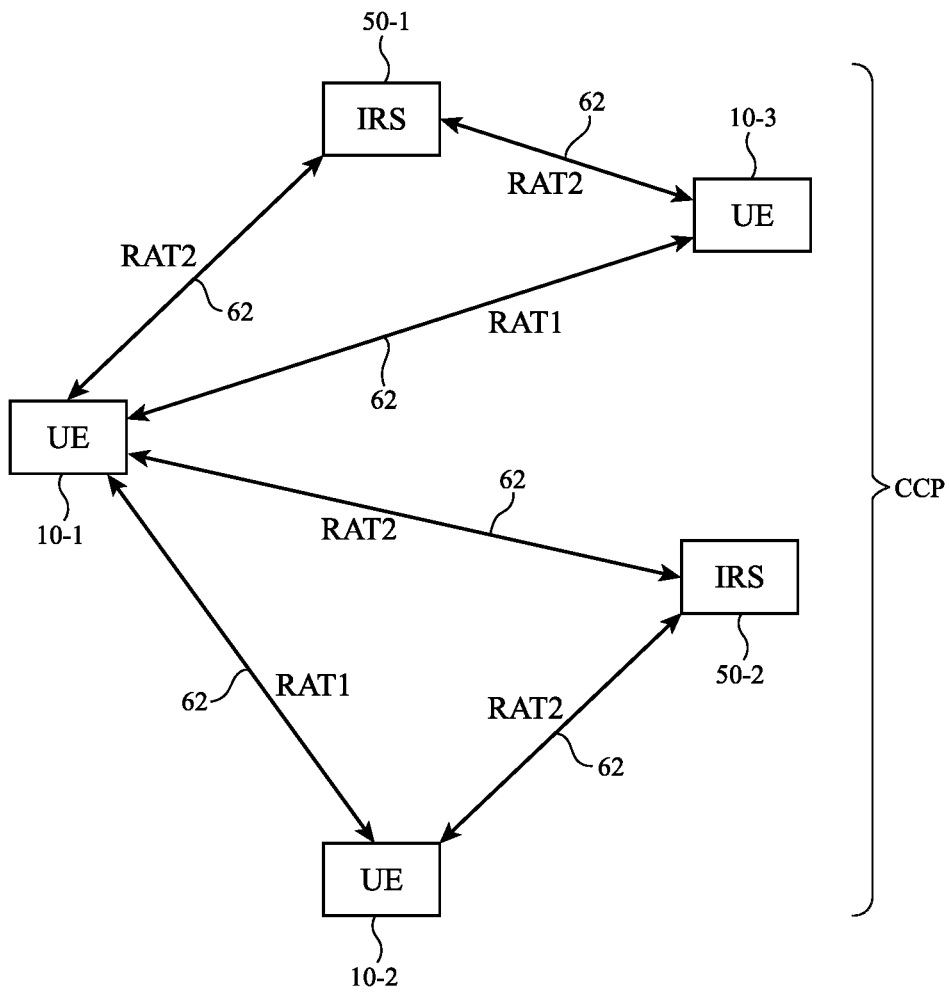
FIG. 9 is a diagram showing how UE devices and network-independent IRS's may use different radio access technologies (RATs) to communicate over the CCP in accordance with some embodiments.

FIG. 9 is a diagram showing how different physical methodologies (RATs) may be used to support the CCP for different NI communications paths 62 (e.g., as selected while processing operation 88 of FIG. 5). As shown in FIG. 9, the CCP and NI communications paths 62 may be used to perform communications between UE devices 10-1, 10-2, and 10-2 and IRS's 50-1 and 50-2 (e.g., for three respective virtual UE devices in communication with each other and that share one or both of IRS's 50-1 and 50-2). If desired, the NI communications paths 62 between UE devices such as the NI communications path 62 between UE device 10-1 and UE device 10-3 and the NI communications path 62 between UE device 10-1 and UE device 10-2 may be implemented using a first RAT such as RAT1. At the same time, the NI communications path 62 between UE device 10-1 and IRS 50-1, the NI communications path 62 between UE device 10-3 and IRS 50-1, the NI communications path 62 between UE device 10-1 and IRS 50-2, and the NI communications path 62 between UE device 10-2 and IRS 50-2 may be implemented using a second RAT such as RAT2. RAT1 may support relatively high data rates whereas RAT2 may support relatively low data rates. For example, RAT1 may be Wi-Fi direct or cellular sidelink whereas RAT2 is UWB. This may allow CCP communications between UE devices to support higher data rates than between UE devices and IRS's (e.g., because more data is typically conveyed between UE devices than between UE devices and IRS's) while minimizing the power and cost of IRS's 50.

If desired, multiple UE devices 10 located near the same IRS may be scheduled for the same TTI (e.g., under an OFDMA and/or MU-MIMO scheme). In these scenarios, control of the IRS may be shared between the co-located UE devices 10. UE-to-IRS communications over the CCP may be performed using low-cost modulation (e.g., UWB) or using an unlicensed band. UE-to-UE communication over the CCP may use an unlicensed band (e.g., UWB or Wi-Fi Direct), cellular sidelink, etc. The UE devices 10 may communicate with each other using the sidelink to achieve a common decision on IRS passive beamforming, to achieve better channel measurement quality, and/or to avoid interference in control communication, for example. The CCP procedures may also be extended to the Nearby Communication protocol if desired.

Figure 10:
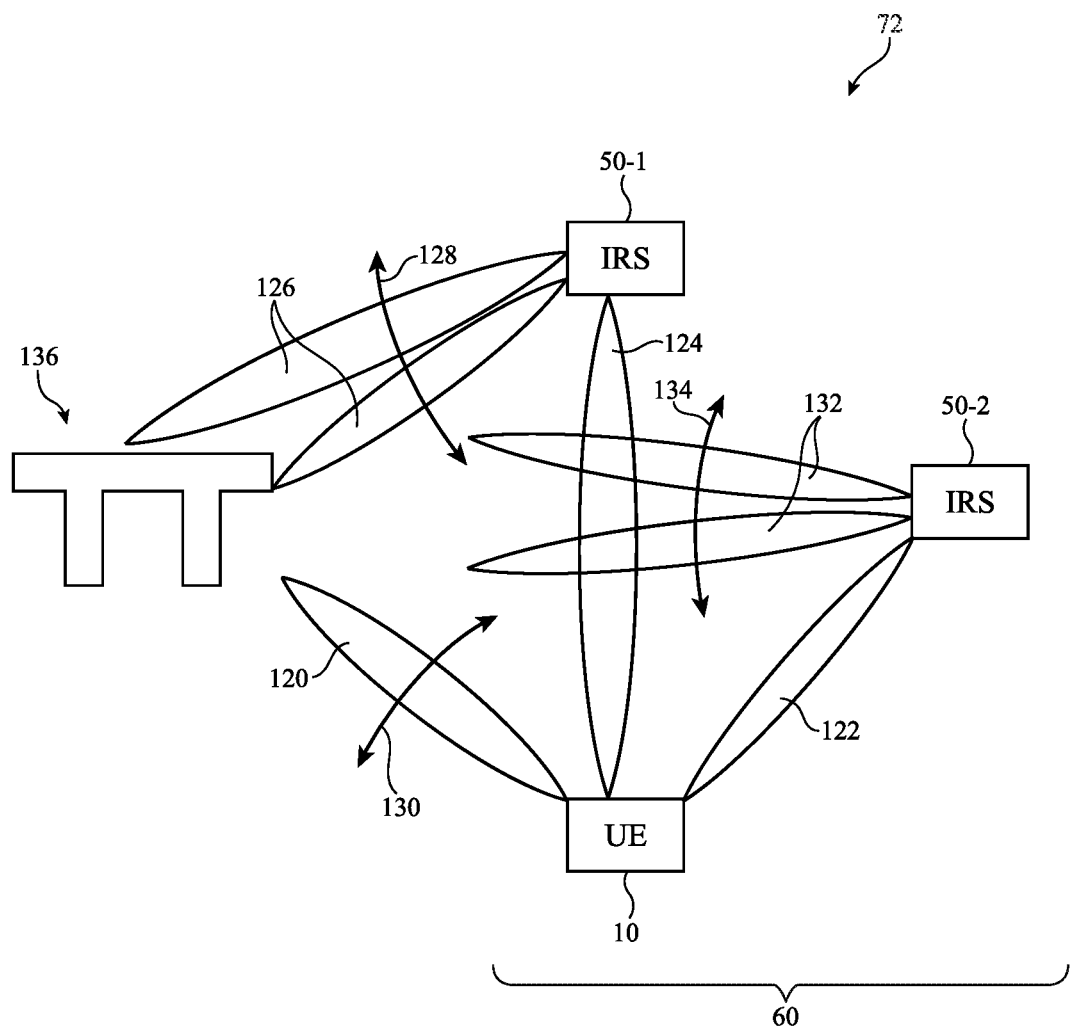
FIG. 10 is a diagram showing how an illustrative UE device may use the CCP and one or more network-independent IRS's to perform radio-frequency sensing on an external object in accordance with some embodiments.

FIG. 10 is a diagram showing how an illustrative UE device 10 may use the CCP and one or more network-independent IRS's to perform radio-frequency sensing on an external object (e.g., while processing operation 96 of FIG. 5). As shown in FIG. 10, virtual UE device 60 may include UE device 10, a first IRS 50-1, and a second IRS 50-2.

UE device 10 may use high frequency radio resources to perform simultaneous location and mapping (SLAM) of an external object such as object 136 with the help of IRS's 50-1 and 50-2. This procedure may involve the transmission and reception of radio-frequency signals by UE device 10 within signal beam 120. UE device 10 may measure the transmitted and received signals to detect the distance between UE device 10 and object 136. UE device 10 may steer signal beam 120, as shown by arrow 130, to sweep over object 136 to spatially map object 136 and/or its location relative to UE device 10. At the same time, UE device 10 may transmit radio-frequency signals 124 to IRS 50-1, which reflects the radio-frequency signals within a corresponding beam 126. The beamforming coefficients of IRS 50-1 may be adjusted over time to sweep beam 126, as shown by arrow 128. UE device 10 may receive reflected signals from signal beam 126 and IRS 50-1 and may process the transmitted and reflected signals to spatially map object 136 and/or its location relative to IRS 50-1 and/or UE device 10. At the same time, UE device 10 may transmit radio-frequency signals 122 to IRS 50-2, which reflects the radio-frequency signals within a corresponding beam 132. The beamforming coefficients of IRS 50-2 may be adjusted over time to sweep beam 132, as shown by arrow 134. UE device 10 may receive reflected signals from signal beam 132 and IRS 50-2 and may process the transmitted and reflected signals to spatially map object 136 and/or its location relative to IRS 50-2 and/or UE device 10.

In this way, IRS 50-1 and IRS 50-2 may provide additional spatial mapping data about object 136 from other fields of view within environment 72 than the field of view that UE device 10, thereby allowing UE device 10 to gather a more complete spatial map of object 136 and its location. UE device 10 may use the CCP (e.g., using the cellular sidelink) to configure the beamforming coefficients of IRS 50-1 (e.g., to form and sweep beam 126) and IRS 50-2 (e.g., to form and sweep beam 132). If desired, UE device 10 may control IRS 50-1 and IRS 50-2 using a different modulation than is used to transmit signals for reflection and mapping of object 136. Channel estimation between the IRS and UE device 10 may also be performed in this way. For example, based on the positioning and sweeping procedure of the IRS, beamforming coefficients may be selected to reflect the signal back to the UE device.

Figure 11:
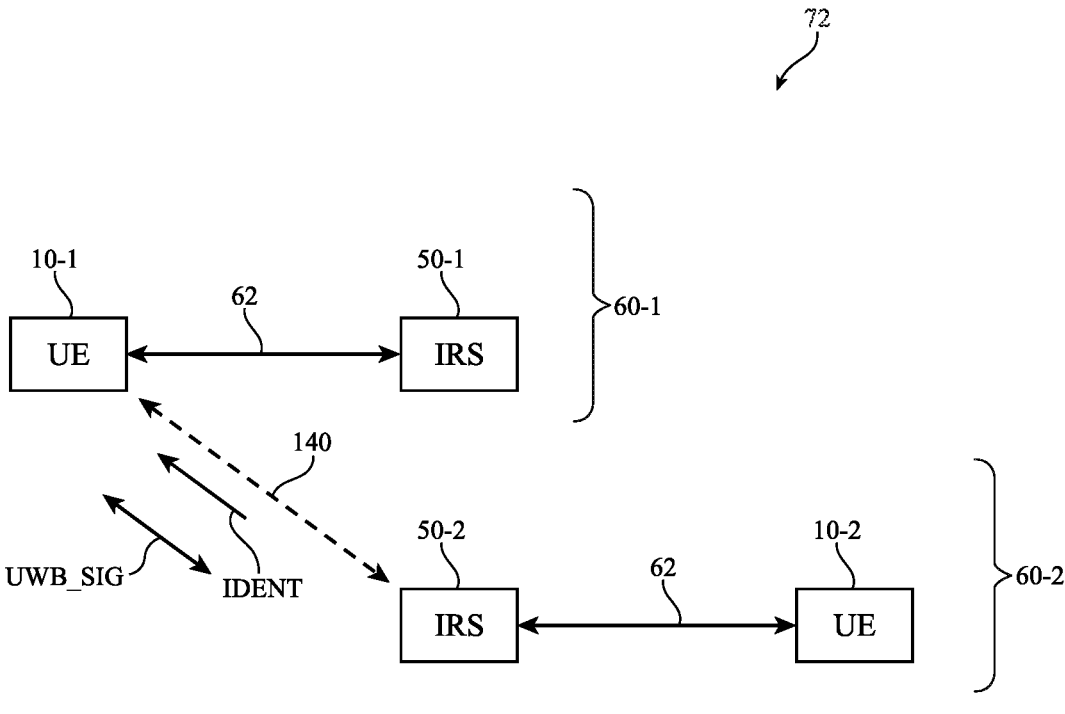
FIG. 11 is a diagram showing how an illustrative UE device may identify a network-independent IRS associated with a different UE device in accordance with some embodiments.

FIG. 11 is a diagram showing how an illustrative UE device may identify a network-independent IRS associated with a different UE device (e.g., during the synchronization performed at operation 84 of FIG. 5). As shown in FIG. 11, a first virtual UE device 60-1 may include a first UE device 10-1 and a first IRS 50-1 controlled by first UE device 10-1 over the CCP and a corresponding NI communications path 62. There may also be a nearby second virtual UE device 60-2 that includes a second UE device 10-2 and a second IRS 50-2 controlled by second UE device 10-2 over the CCP and a corresponding NI communications path 62.

In general, a given UE device such as UE device 10-1 may use the CCP to discover and synchronize with the IRS(s) 50 controlled by other UE devices. For example, UE device 10-1 may use the CCP and communications path 140 (e.g., an NI communications path) to receive identification information from IRS 50-2 when UE device 10-1 is in the vicinity of UE device 10-1. Communications path 140 may, for example, be implemented using UWB or Bluetooth. The identification information may include a globally unique identifier IDENT transmitted by IRS 50-2 over the CCP (e.g., periodically, upon request by UE device 10-1, etc.). Additionally or alternatively, the identification information may include UWB signals UWB_SIG transmitted by UE device 10-1 and/or IRS 50-2 that are processed to identify the position (coordinates) of IRS 50-2 relative to UE device 10-1. UE device 10-1 may then calculate the identity of IRS 50-2 as a function of the identified coordinates. If desired, a combination of these approaches may be used (e.g., with a random identifier with UWB to perform collision avoidance).

UE device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-11 may be performed by the components of UE device 10, IRS 50, service controller 64, and/or external equipment 34 using software, firmware, and/or hardware (e.g., dedicated circuitry or hardware). Software code for performing these operations may be stored on non-transitory computer readable storage media (e.g., tangible computer readable storage media) stored on one or more of the components of UE device 10, IRS 50, service controller 64, and/or external equipment 34. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of UE device 10, IRS 50, service controller 64, and/or external equipment 34. The processing circuitry may include microprocessors, central processing units (CPUs), application-specific integrated circuits with processing circuitry, or other processing circuitry.

For one or more aspects, at least one of the components set forth in one or more of the preceding figures may be configured to perform one or more operations, techniques, processes, or methods as set forth in the example section below. For example, circuitry associated with a UE device, base station, access point, network element, IRS, service controller, etc. as described above in connection with one or more of the preceding figures may be configured to operate in accordance with one or more of the examples set forth below in the example section.

EXAMPLES

In the following sections, further exemplary aspects are provided.

Example 1 includes a method of operating a system having a user equipment (UE) device and an intelligent reflecting surface (IRS), the method comprising: using a channel control plane (CCP) to convey control signals within a virtual UE device that overlies the UE device and the IRS; using the CCP to configure antenna elements on the IRS with a set of beamforming coefficients; and with the IRS, reflecting wireless signals between a wireless base station and the UE device while the antenna elements are configured with the set of beamforming coefficients, wherein the wireless signals perform functions of a control plane and a data plane of the wireless base station that are different from the CCP.

Example 2 includes the method of example 1 or some other example or combination of examples herein, further comprising: with the UE device, generating channel measurements associated with radio-frequency propagation between the UE device and the IRS; with the UE device, generating the beamforming coefficients based on the channel measurements; and with the UE device, using the CCP to transmit the beamforming coefficients to the IRS.

Example 3 includes the method of examples 1 or 2 or some other example or combination of examples herein, further comprising: with the UE device and at least one other UE device, using the CCP to elect the UE device as a primary UE device that controls the IRS.

Example 4 includes the method of any one of examples 1-3 or some other example or combination of examples herein, further comprising: with the UE device, using the CCP to transmit cellular configuration parameters, scheduling information, and the channel measurements to at least one other UE device or a service controller.

Example 5 includes the method of any one of examples 1-4 or some other example or combination of examples herein, further comprising: with the UE device, using the CCP to control at least one other UE device to generate at least some of the beamforming coefficients.

Example 6 includes the method of any one of examples 1-5 or some other example or combination of examples herein, further comprising with a service controller, using the CCP to control the UE device to generate channel measurements associated with radio-frequency propagation between the UE device and the IRS; with the service controller, receiving the channel measurements from the UE device over the CCP; with the service controller, generating the beamforming coefficients based on the channel measurements; and with the service controller, using the CCP to transmit the beamforming coefficients to the IRS.

Example 7 includes the method of any one of examples 1-6 or some other example or combination of examples herein, further comprising: with the service controller, using the CCP to transmit cellular configuration parameters and scheduling information to the UE device.

Example 8 includes the method of any one of examples 1-7 or some other example or combination of examples herein, further comprising: with a service controller, using the CCP to control the UE device to generate channel measurements associated with radio-frequency propagation between the UE device and the IRS and to generate the beamforming coefficients based on the channel measurements; with the service controller, receiving the beamforming coefficients from the UE device over the CCP; and with the service controller, using the CCP to transmit the beamforming coefficients to the IRS.

Example 9 includes the method of any one of examples 1-8 or some other example or combination of examples herein, further comprising: with the UE device, using the CCP and the IRS to perform simultaneous localization and mapping on an external object.

Example 10 includes the method of any one of examples 1-9 or some other example or combination of examples herein, further comprising: with the UE device, transmitting at least some of the control signals to the IRS over the CCP using a physical interface; and with the UE device, transmitting at least some of the control signals to another UE device over the CCP using a second physical interface that supports higher data rates than the first physical interface.

Example 11 includes the method of any one of examples 1-10 or some other example or combination of examples herein, wherein the first physical interface comprises ultra-wideband and wherein the second physical interface comprises Wi-Fi Direct or a cellular sidelink.

Example 12 includes a user equipment (UE) device comprising: one or more antennas configured to transmit wireless signals to external equipment via reflection off an intelligent reflecting surface (IRS), the wireless signals operating over a control plane and a data plane of the external equipment; and one or more processors configured to generate control signals that control operation of the IRS, and use the one or more antennas to transmit the control signals to the IRS over a channel control plane (CCP) that is different from the control plane and the data plane of the external equipment.

Example 13 includes the method of example 12 or some other example or combination of examples herein, wherein the control signals comprise scheduling information.

Example 14 includes the method of example 12, 13, or some other example or combination of examples herein, wherein the one or more processors is further is configured to: generate channel measurements characterizing radio-frequency propagation between the UE device and the IRS; and generate beamforming coefficients for the IRS based on the channel measurements, the control signals including the beamforming coefficients.

Example 15 includes the method of any one of examples 12-14 or some other example or combination of examples herein, wherein the one or more processors is further configured to: generate channel measurements characterizing radio-frequency propagation between the UE device and the IRS; and use the one or more antennas to transmit the channel measurements to another UE device or a service controller over the CCP.

Example 16 includes the method of any one of examples 12-15 or some other example or combination of examples herein, wherein the one or more processors is configured to use the one or more antennas to receive an identifier transmitted over the CCP by an additional IRS in proximity to the UE device, the additional IRS being controlled, via the CCP, by another UE device.

Example 17 includes the method of any one of examples 12-16 or some other example or combination of examples herein, wherein the one or more antennas is configured to transmit the wireless signals using a first radio access technology and is configured to transmit the control signals over the CCP using a second radio access technology associated with lower data rates than the first radio access technology.

Example 18 includes the method of any one of examples 12-17 or some other example or combination of examples herein, wherein the control signals comprise synchronization information, the one or more processors being configured to use the control signals transmitted over the CCP to synchronize the UE device with another UE device or the IRS.

Example 19 includes a method of operating an intelligent reflecting surface (IRS) comprising: with one or more processors, generating channel measurements characterizing radio-frequency propagation between the IRS and one or more user equipment (UE) devices; with the one or more processors, generating beamforming coefficients based on the channel measurements; and with a set of antenna elements, using the beamforming coefficients to reflect wireless signals between the one or more UE devices and a wireless base station.

Example 20 includes the method of example 19 or some other example or combination of examples herein, wherein the wireless signals support a data plane and a control plane associated with the wireless base station, the method further comprising: using a channel control plane (CCP) that is different from the control plane and the data plane of the wireless base station to inform the one or more UE devices or a service controller of the beamforming coefficients or the channel measurements.

Example 21 may include an apparatus comprising means to perform one or more elements of a method described in or related to any of examples 1-20 or any combination thereof, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20 or any combination thereof, or any other method or process described herein.

Example 23 may include an apparatus comprising logic, modules, or circuitry to perform one or more elements of a method described in or related to any of examples 1-20 or any combination thereof, or any other method or process described herein.

Example 24 may include a method, technique, or process as described in or related to any of examples 1-20 or any combination thereof, or portions or parts thereof.

Example 25 may include an apparatus comprising: one or more processors and one or more non-transitory computer-readable storage media comprising instructions that, when executed by the one or more processors, cause the one or more processors to perform the method, techniques, or process as described in or related to any of examples 1-20, or any combination thereof, or portions thereof.

Example 26 may include a signal as described in or related to any of examples 1-20, or any combination thereof, or portions or parts thereof.

Example 27 may include a datagram, information element, packet, frame, segment, PDU, or message as described in or related to any of examples 1-20, or any combination thereof, or portions or parts thereof, or otherwise described in the present disclosure.

Example 28 may include a signal encoded with data as described in or related to any of examples 1-20, or any combination thereof, or portions or parts thereof, or otherwise described in the present disclosure.

Example 29 may include a signal encoded with a datagram, IE, packet, frame, segment, PDU, or message as described in or related to any of examples 1-20, or any combination thereof, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or any combination thereof, or portions thereof.

Example 31 may include a computer program comprising instructions, wherein execution of the program by a processing element is to cause the processing element to carry out the method, techniques, or process as described in or related to any of examples 1-20, or any combination thereof, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description but is not intended to be exhaustive or to limit the scope of aspects to the precise form disclosed.

The foregoing is merely illustrative and various modifications can be made to the described embodiments. The foregoing embodiments may be implemented individually or in any combination.

What is claimed is:

1. A method of operating a system having a user equipment (UE) device, a wireless base station, and an intelligent reflecting surface (IRS), the method comprising:
   wirelessly conveying control signals within a virtual UE device via a channel control plane (CCP), the virtual UE device including the UE device and the IRS;
   configuring, using the CCP, antenna elements on the IRS with a set of beamforming coefficients;
   reflecting, at the IRS, wireless signals between the wireless base station and the UE device while the antenna elements are configured with the set of beamforming coefficients, the wireless signals performing functions of a control plane and a data plane of the wireless base station that are different from the CCP;
   receiving, at a receiver of a service controller and using the CCP, channel measurements from the UE device;
   generating, at one or more processors of the service controller, the beamforming coefficients based on the channel measurements; and
   transmitting, using a transmitter of the service controller and the CCP, the beamforming coefficients to the IRS.

2. The method of claim 1, further comprising:
   electing, using the CCP, the UE device, and at least one other UE device, the UE device as a primary UE device that controls the IRS.

3. The method of claim 1, further comprising:
   controlling, using the service controller and the CCP, the UE device to generate the channel measurements based on radio-frequency propagation between the UE device and the IRS.

4. The method of claim 3, further comprising:
   with the service controller, using the CCP to transmit cellular configuration parameters and scheduling information to the UE device.

5. The method of claim 1, further comprising:
   controlling, using a transmitter on the UE device and the CCP, the IRS to perform sensing or simultaneous localization and mapping on an external object.

6. The method of claim 1, further comprising:
   transmitting, using a transmitter on the UE device using a first physical interface of the CCP, at least some of the control signals to the IRS; and
   transmitting, using the transmitter on the UE device and a second physical interface of the CCP that supports higher data rates than the first physical interface, at least some of the control signals to another UE device.

7. The method of claim 6, wherein the first physical interface comprises ultrawideband or Bluetooth and wherein the second physical interface comprises Wi-Fi Direct or a cellular sidelink.

8. A method of operating a user equipment (UE) device in a system that includes a wireless base station and an intelligent reflecting surface (IRS), the method comprising:
   wirelessly conveying, using wireless circuitry, control signals within a virtual UE device via a channel control plane (CCP), the virtual UE device including the UE device and the IRS;
   configuring, using the CCP, antenna elements on the IRS using a set of beamforming coefficients;

receiving, via reflection off the IRS, wireless signals transmitted by the wireless base station while the antenna elements are configured using the set of beamforming coefficients;

generating, using one or more processors, channel measurements associated with radio-frequency propagation between the UE device and the IRS;

generating, using the one or more processors, the beamforming coefficients based on the channel measurements; and transmitting, using a transmitter and the CCP, the beamforming coefficients to the IRS.

9. The method of claim 8, wherein the wireless signals perform functions of a control plane and a data plane of the wireless base station that are different from the CCP.

10. The method of claim 8, further comprising:

transmitting, using the transmitter and the CCP, cellular configuration parameters, scheduling information, and the channel measurements to at least one other UE device or a service controller.

11. The method of claim 8, further comprising:

controlling, using the transmitter and the CCP, at least one other UE device to generate at least some of the beamforming coefficients.

12. An electronic device comprising:

one or more antennas configured to transmit wireless signals to external equipment via reflection off an intelligent reflecting surface (IRS), the wireless signals operating over a control plane and a data plane of the external equipment;

a transmitter configured to use the one or more antennas to transmit control signals that control operation of the IRS to the IRS over a channel control plane (CCP) that is different from the control plane and the data plane of the external equipment; and a receiver configured to use the one or more antennas to receive an identifier transmitted over the CCP by an additional IRS, the additional IRS being controlled, via the CCP, by another electronic device.

13. The electronic device of claim 12, wherein the control signals comprise scheduling information.

14. The electronic device of claim 12, further comprising one or more processors configured to:

generate channel measurements characterizing radio-frequency propagation between the electronic device and the IRS; and generate beamforming coefficients for the IRS based on the channel measurements, the control signals including the beamforming coefficients.

15. The electronic device of claim 12, further comprising one or more processors configured to:

generate channel measurements characterizing radio-frequency propagation between the electronic device and the IRS, the transmitter being configured to use the one or more antennas to transmit the channel measurements to another electronic device or a service controller over the CCP.

16. The electronic device of claim 12, wherein the additional IRS is in proximity to the electronic device.

17. The electronic device of claim 12, wherein the one or more antennas are configured to transmit the wireless signals using a first radio access technology and are configured to transmit the control signals over the CCP using a second radio access technology associated with lower data rates than the first radio access technology.

18. The electronic device of claim 12, wherein the control signals comprise synchronization information and the electronic device comprises one or more processors configured to use the control signals transmitted over the CCP to synchronize the electronic device with another electronic device or the IRS.

*    *    *    *    *